(12) United States Patent
Gras et al.

(10) Patent No.: US 11,493,975 B2
(45) Date of Patent: Nov. 8, 2022

(54) SYSTEM, APPARATUS AND METHOD FOR PROVIDING POWER MONITORING ISOLATION IN A PROCESSOR

(71) Applicant: Intel Corporation, Santa Clara, CA (US)

(72) Inventors: Benjamin Gras, Amsterdam (NL); Neer Roggel, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 17/030,692

(22) Filed: Sep. 24, 2020

(65) Prior Publication Data
US 2022/0091651 A1 Mar. 24, 2022

(51) Int. Cl.
- G06F 1/28 (2006.01)
- G06F 9/455 (2018.01)
- G06F 9/50 (2006.01)

(52) U.S. Cl.
CPC ............ G06F 1/28 (2013.01); G06F 9/45558 (2013.01); G06F 9/5094 (2013.01); *G06F 2009/4557* (2013.01)

(58) Field of Classification Search
CPC ...... G06F 1/28; G06F 9/45558; G06F 9/5094; G06F 2009/4557
See application file for complete search history.

(56) References Cited

U.S. PATENT DOCUMENTS

| | | | |
|---|---|---|---|
| 9,959,188 B1* | 5/2018 | Krishnan | G06F 9/45533 |
| 2011/0185356 A1* | 7/2011 | Shetty | G06F 9/45558 |
| | | | 718/1 |
| 2011/0239015 A1* | 9/2011 | Boyd | G06F 9/4843 |
| | | | 713/320 |
| 2012/0260117 A1* | 10/2012 | Acar | G06F 1/3243 |
| | | | 713/340 |
| 2012/0296585 A1* | 11/2012 | Chen | G06F 1/28 |
| | | | 702/61 |
| 2012/0330802 A1* | 12/2012 | Guthrie | G06Q 50/10 |
| | | | 711/119 |

(Continued)

OTHER PUBLICATIONS

Xing Gao, et al., "ContainerLeaks: Emerging Security Threats of Information Leakages in Container Clouds," 2017, 12 pages total.

(Continued)

*Primary Examiner* — Aurel Prifti
(74) *Attorney, Agent, or Firm* — Trop, Pruner & Hu, P.C.

(57) ABSTRACT

In one embodiment, a processor comprises a plurality of cores and a controller. Each of the plurality of cores may include: an execution circuit, a power measurement circuit to measure power consumption of the core and a first register to store a power-related context identifier to identify a process to be executed on the core. The controller may include: a plurality of energy status registers each associated with a power-related context identifier and to store energy consumption information of a process; and a control circuit coupled to the plurality of energy status registers, where the control circuit is to enable each of a plurality of processes to independently monitor the energy consumption information of the process and prevent each of the plurality of processes from monitoring the energy consumption information of other ones of the plurality of processes. Other embodiments are described and claimed.

20 Claims, 23 Drawing Sheets

(56) References Cited

U.S. PATENT DOCUMENTS

| | | | | |
|---|---|---|---|---|
| 2013/0283083 | A1* | 10/2013 | Vilhauer | G06F 1/28 713/340 |
| 2014/0143558 | A1* | 5/2014 | Kuesel | G06F 1/26 713/300 |
| 2014/0149752 | A1* | 5/2014 | Brock | G06F 11/3476 713/300 |
| 2016/0179177 | A1* | 6/2016 | Henry | G06F 15/163 713/320 |
| 2017/0206118 | A1* | 7/2017 | Therien | G06F 1/3296 |
| 2018/0196487 | A1* | 7/2018 | Prabhakar | G06F 11/3096 |
| 2018/0232038 | A1* | 8/2018 | Surdu | G06F 1/3234 |
| 2019/0102233 | A1* | 4/2019 | Santambrogio | G06F 9/5094 |
| 2019/0384348 | A1* | 12/2019 | Srinivasan | G06F 1/3203 |
| 2020/0042698 | A1* | 2/2020 | Urias | G06F 9/545 |
| 2020/0225724 | A1* | 7/2020 | MacNamara | G06F 1/3296 |
| 2020/0287902 | A1* | 9/2020 | Heller | G06F 12/109 |
| 2021/0049045 | A1* | 2/2021 | Leng | G06F 9/5027 |
| 2021/0216427 | A1* | 7/2021 | Zhang | G06F 3/0634 |

OTHER PUBLICATIONS

Heiko Mantel, et al., "How Secure is Green IT? The Case of Software-Based Energy Side Channels," 2018, 20 pages total.

Thales Bandiera Paiva, et al., "Robust Covert Channels Based on DRAM Power Consumption," 2019, 15 pages total.

Heiko Mantel, et al., "Vulnerabilities Introduced by Features for Software-based Energy Measurement," Technical Report, Nov. 2017, 32 pages total.

European Patent Office, Office Action dated Jan. 31, 2022 in European Patent Application No. 21190303.4 (12 pages).

* cited by examiner

SYSTEM, APPARATUS AND METHOD FOR PROVIDING POWER MONITORING ISOLATION IN A PROCESSOR

TECHNICAL FIELD

Embodiments relate to power measurement in a processor.

BACKGROUND

In modern processors, power consumption is a metric that many users seek to manage, e.g., reduce. To this end, processors typically include some type of internal power controller. Often, a software power meter (such as a Running Average Power Limit (RAPL) monitor) only provides aggregate power consumption of coarsely defined domains of the processor (e.g., all cores). This situation results in a side channel security problem, because power use is a realistic and powerful side channel threat vector that, when measured, can even leak secrets from a trusted execution environment. Further, such coarsely maintained information has limited usefulness in a multi-tenant (e.g., multiple virtual machine (VM)) scenario, because per-tenant power monitoring is not possible. Furthermore, RAPL is typically not exposed to VMs.

DETAILED DESCRIPTION

Figure 1:
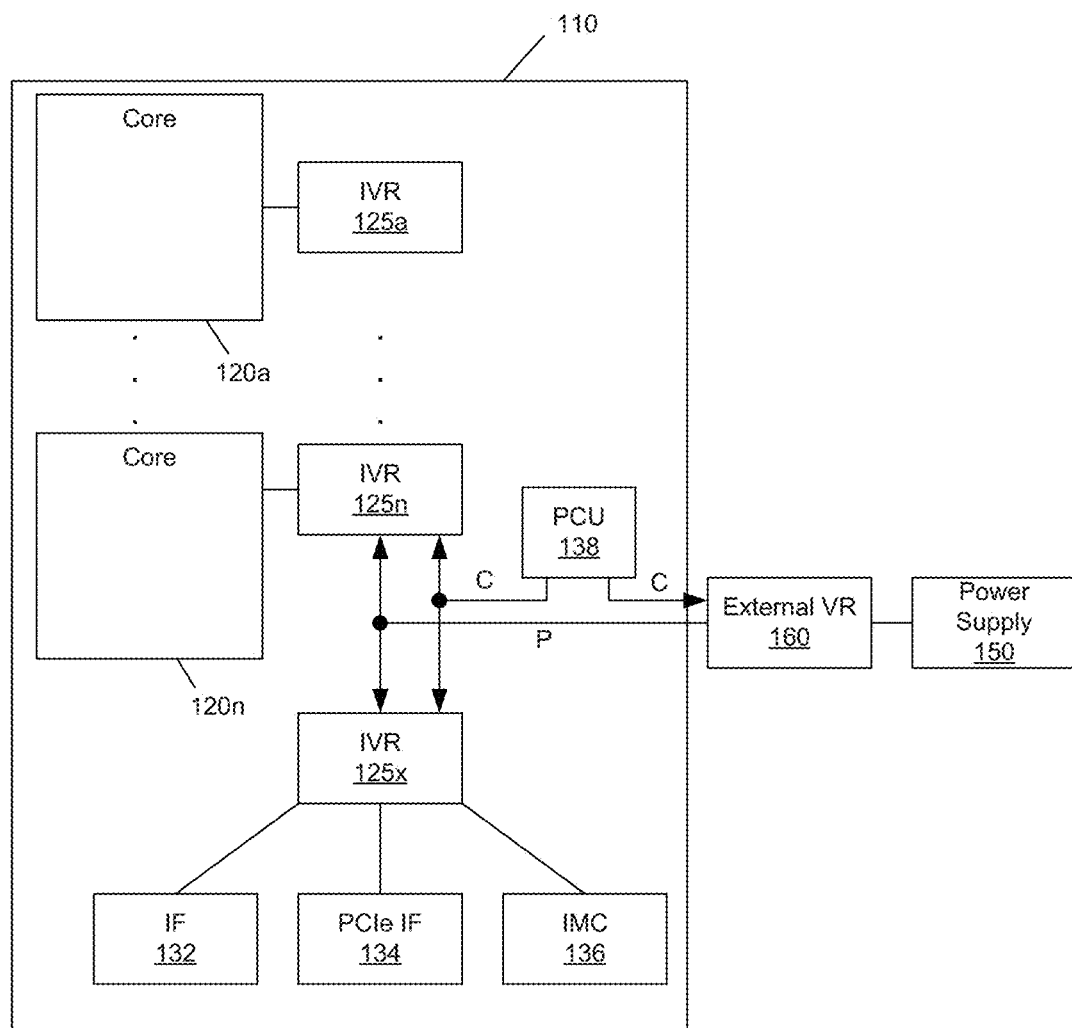
FIG. 1 is a block diagram of a portion of a system in accordance with an embodiment of the present invention.

In various embodiments, a processor is provided with hardware-based techniques to enable fine-grained measurement of power consumption by different workloads, e.g., different virtual machines, processes or other contexts, that execute on one or more cores or other processing circuits of the processor. To this end, various sets of power-related registers may be provided and virtualized, such that a given set of such power-related registers may be associated with a particular VM or other process in execution on one or more cores.

In a particular embodiment, a processor is able to maintain multiple independent power monitoring contexts each to be associated with a given workload in execution (such as VM, process or so forth), generally referred to herein as RAPL contexts, to virtualize at least certain power management storage facilities. Although embodiments are not limited in this regard, one example register to be virtualized may be an ENERGY_STATUS RAPL model specific register (MSR). As a result, power consumption information such as RAPL may be accumulated as energy used on a per-RAPL context basis. In this way, the power consumption information may be maintained in a fine-grained manner according to what software is running on what hardware (e.g., core) at a given time.

To effect this arrangement, system software may specify a RAPL context for which power readings are to be obtained, and each RAPL context is readable, e.g., through different MSRs separately. This allows guest software such as processes and VMs to have their own power readings and solves a security problem. As such, embodiments enable each VM to read its own power usage, isolated from all other power usage on a system, providing a useful feature for customers and solving a security problem that access to aggregate power readings may expose. To this end, a power controller, in connection with system software such as a virtual machine monitor, hypervisor or other host software, may enforce isolation to prevent VMs or other processes from accessing power information of another VM or process.

Embodiments may be used in data centers in which servers and other computing resources are configured in a multi-tenant architecture. With embodiments, system software, e.g., of a cloud services provider, may maintain isolation of different workloads (e.g., different VMs) of different tenants that execute on the same server (such as on different cores of one or more processors of the server). In addition, embodiments, enable this system software, in conjunction with a power controller of the one or more processors, to isolate power monitoring information of the different workloads, such that while each individual workload may be authorized to access its own information, it is prevented from accessing this information of other workloads. Stated another way, embodiments provide enforcement to prevent power monitoring information of one VM from being accessed by VMs. And by providing independent maintenance of this information for different workloads (contexts), there is no reason to provide aggregated power monitoring information to a VM, which would be used to leak secrets of one or more other VMs.

In an embodiment, a power management context identifier, generally referred to herein as a power-related context identifier or RAPL context identifier, may be used to identify a set of power state values used to synthesize the RAPL Energy Status MSRs, and other power meters and power limiting registers, for a given RAPL context. Software can switch RAPL contexts by writing to a core scoped register, MSR_CORE_CONTEXT. Energy status then accumulates in that context. This information is readable by each context instantiating its own RAPL Energy Status MSR. Embodiments provide flexibility, such that system software can decide on the usage of context values (for instance, assigning different contexts to different VMs, different process groups or other different entities of its choosing).

In embodiments, each core a processor may include power measurement circuitry that can measure power consumption for all or a portion of the core. With this circuitry, one or more RAPL contexts can be associated with a given core. In a simplest example, a per-core domain can be used to measure power usage for a RAPL context on a per-core basis. Note that in some embodiments, RAPL contexts can be maintained per hyper thread.

A power controller such as a PCU may be used to synthesize RAPL power meter readings and per-RAPL context RAPL energy status values. The PCU may also replicate N copies of RAPL synthesis state. Each replication may be thought of as a single RAPL context. In an embodiment the PCU may synthesize a RAPL Energy Status MSR per context, available at a given frequency (e.g., 1 kHz), exposing all context MSRs to all cores, in package-scoped MSRs. Each core writes a current context ID (e.g., [0 . . . N−1]) that it wants to accumulate power readings under, in a core-scoped MSR. Note that more than one RAPL context ID can be active at the same time on different cores.

In an embodiment, each core may include at least one power-related context MSR, referred to as a MSR_CORE_RAPL_CONTEXT or RAPL context register that it may read/write to indicate which virtualized RAPL energy status ID that this core's power meter is to update. In an embodiment this MSR is written with a value from [0 . . . N−1] (e.g., when a processor includes N cores) to indicate the RAPL context. In turn, a PCU or other power controller may include a plurality of power-related MSRs to store energy status associated with a given RAPL context, referred to as a MSR_PKG_ENERGY_STATUS_X, where X is taken from [0 . . . N−1].

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to independently maintain power-related information, including energy consumption information on a per process (e.g., per virtual machine) basis, such that each process has an independent power-related context (associated with a given power-related context identifier). In addition, PCU 138 may securely maintain this information and provide a given process's information only to that process and prevent other processes from accessing such information, as described further herein.

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
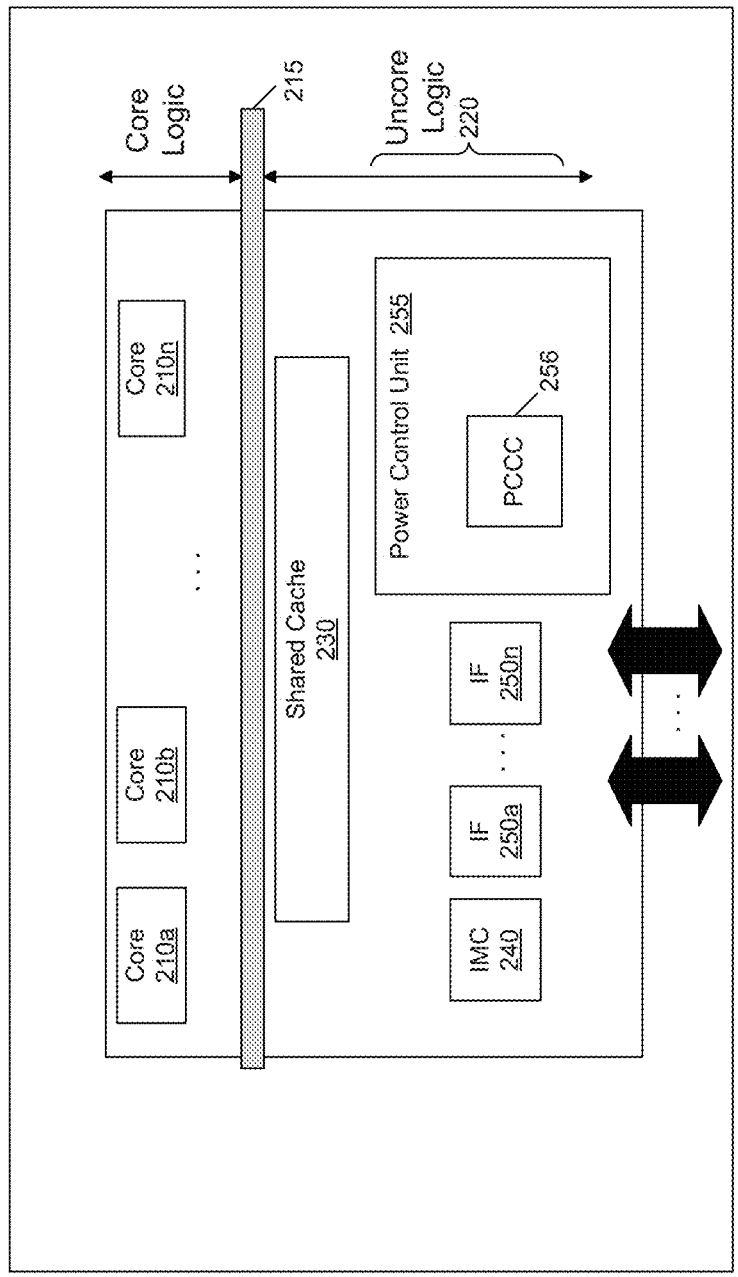
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques as described herein. In addition, power control unit 255 may include a power context control circuit 256, configured to independently maintain and securely protect power-related information, on a per process basis, as described further herein.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
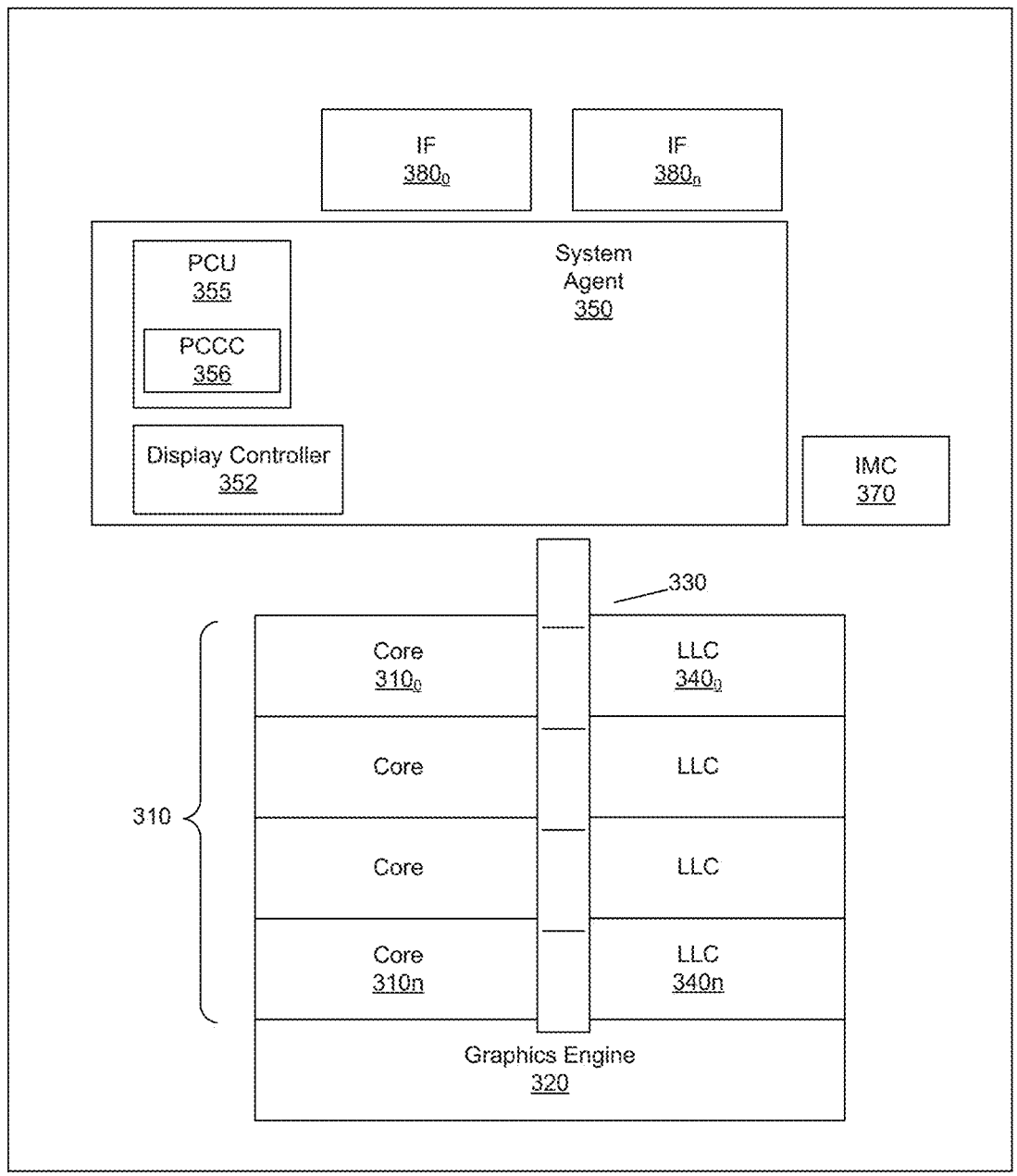
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include a power context control circuit 356, configured to independently maintain and securely protect power-related information, on a per process basis, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
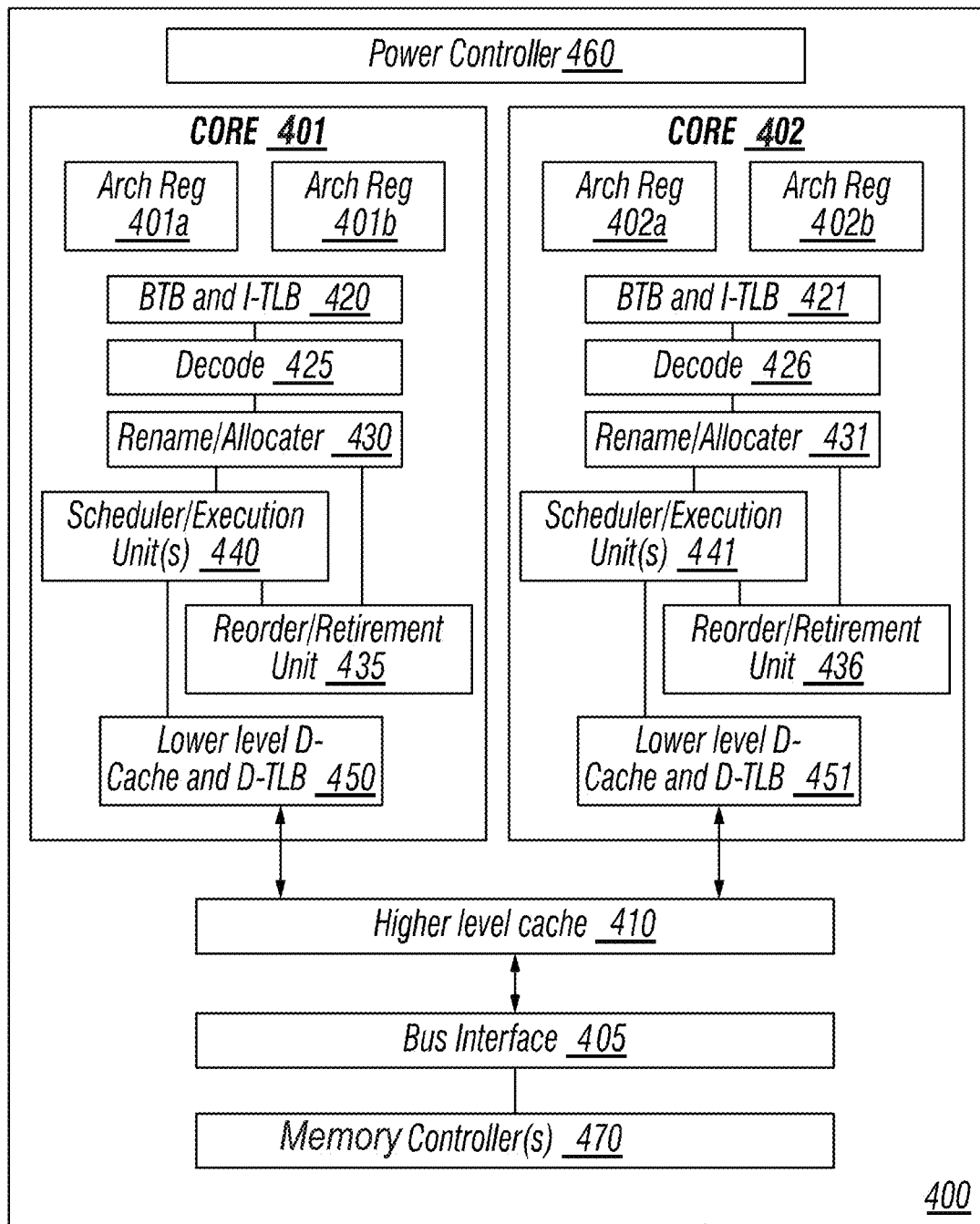
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
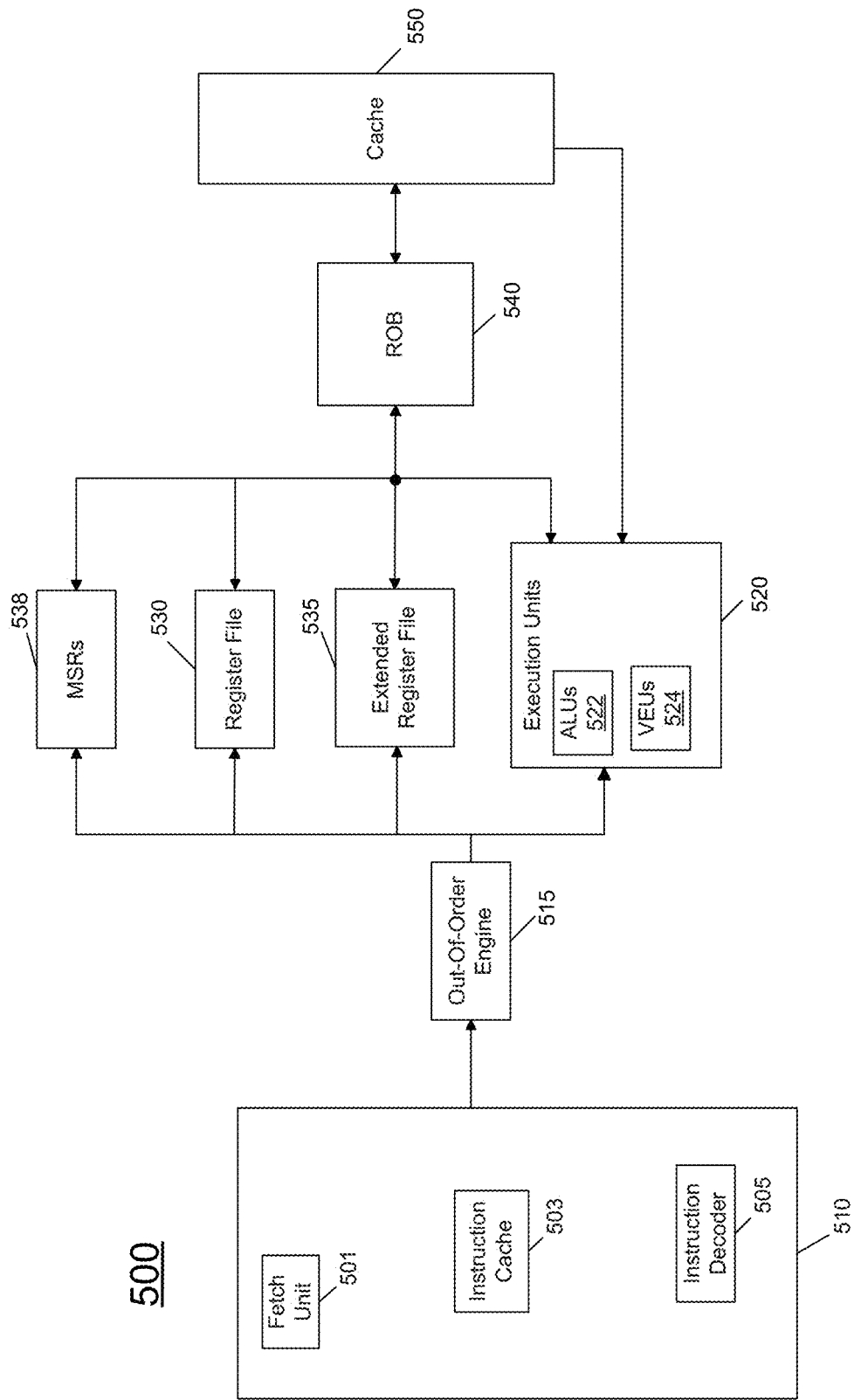
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
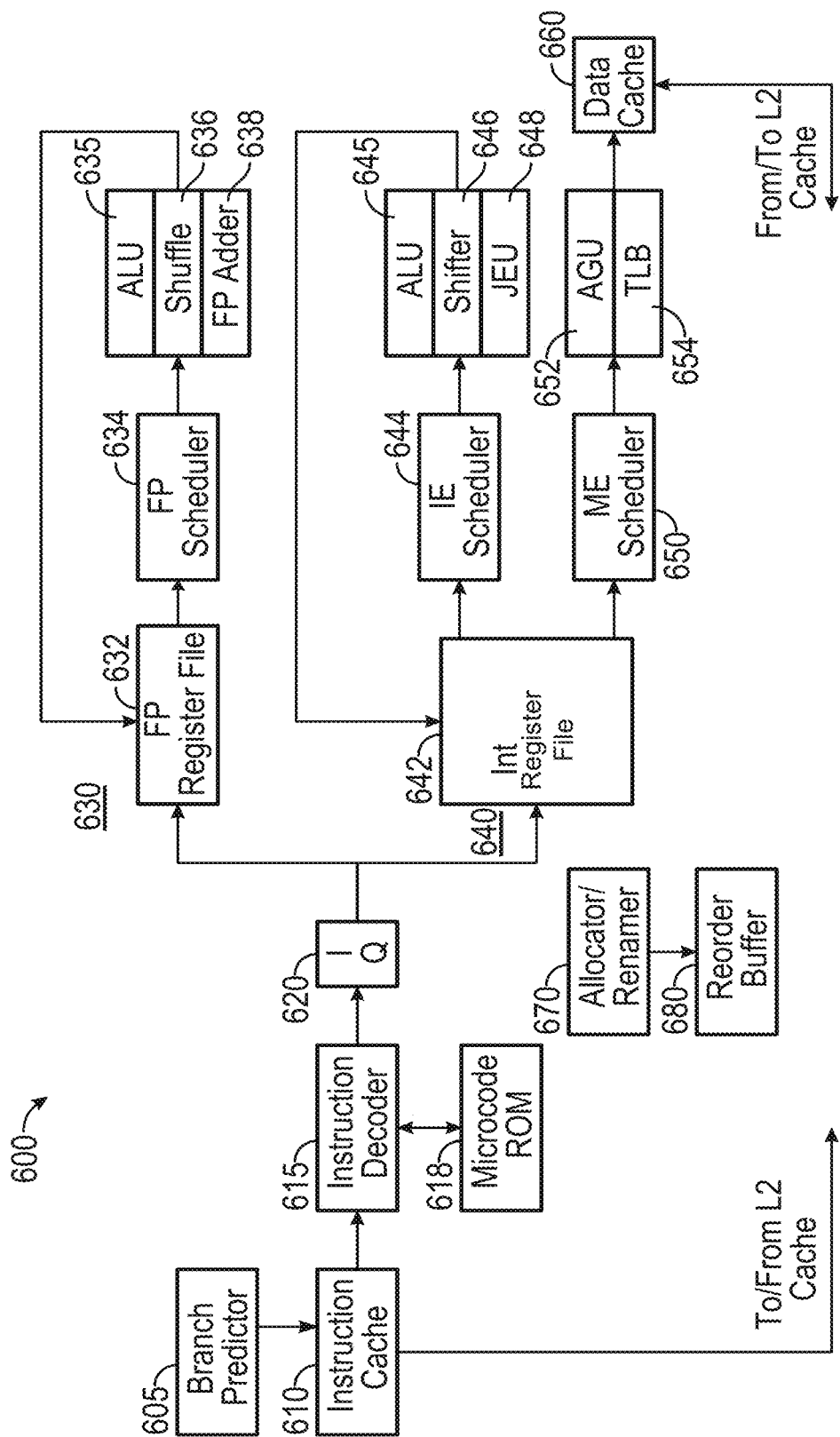
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
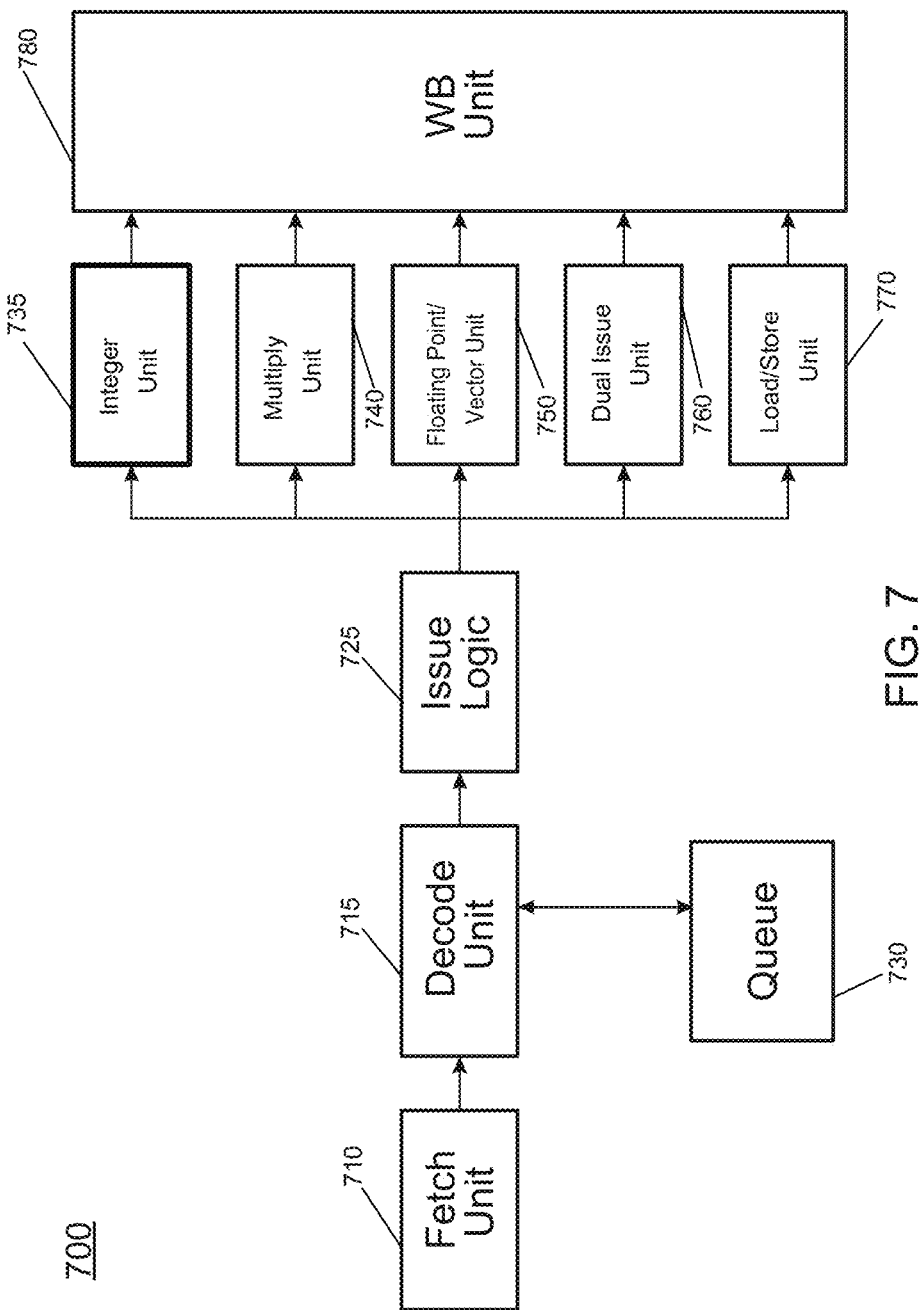
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions, and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
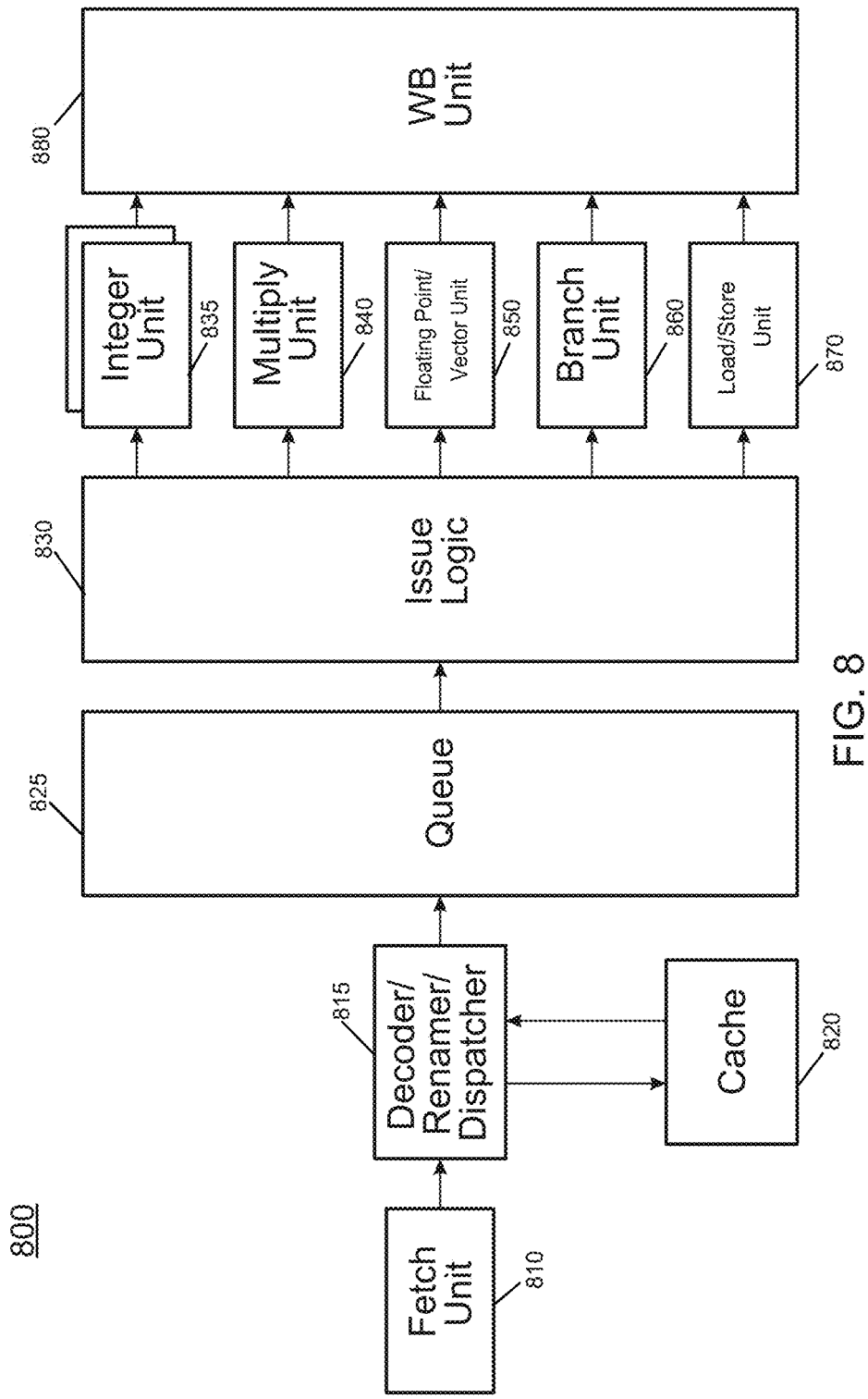
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions, and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
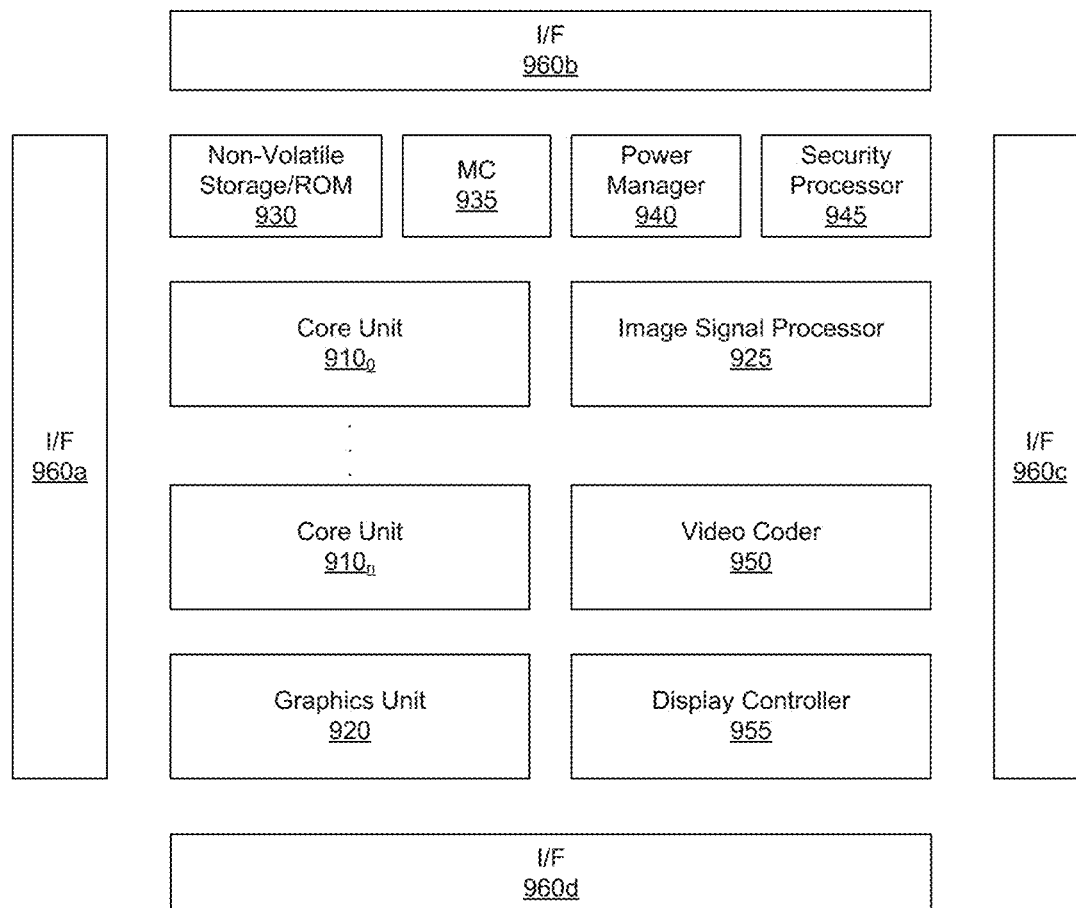
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software, or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including the per-process power-related information management.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
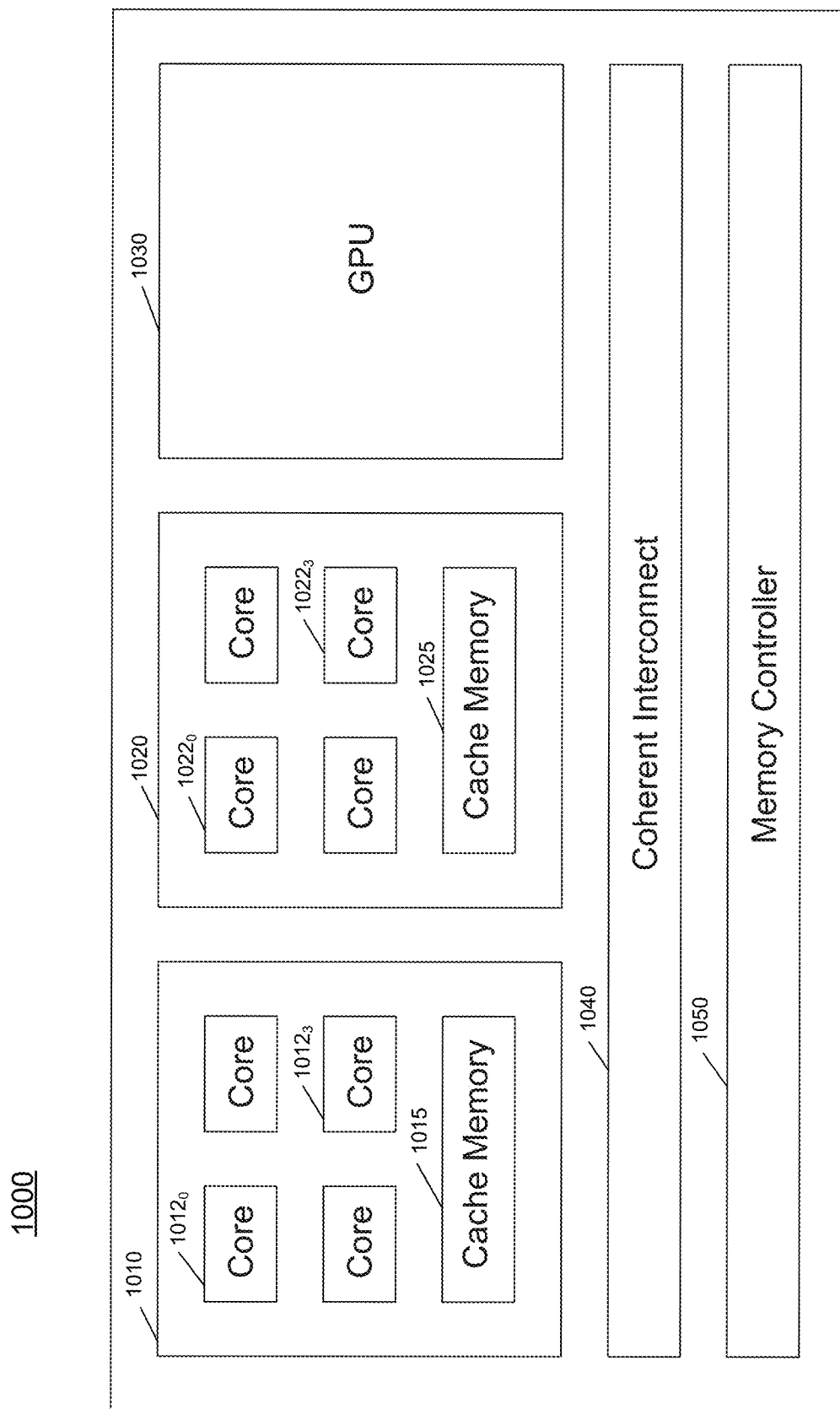
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
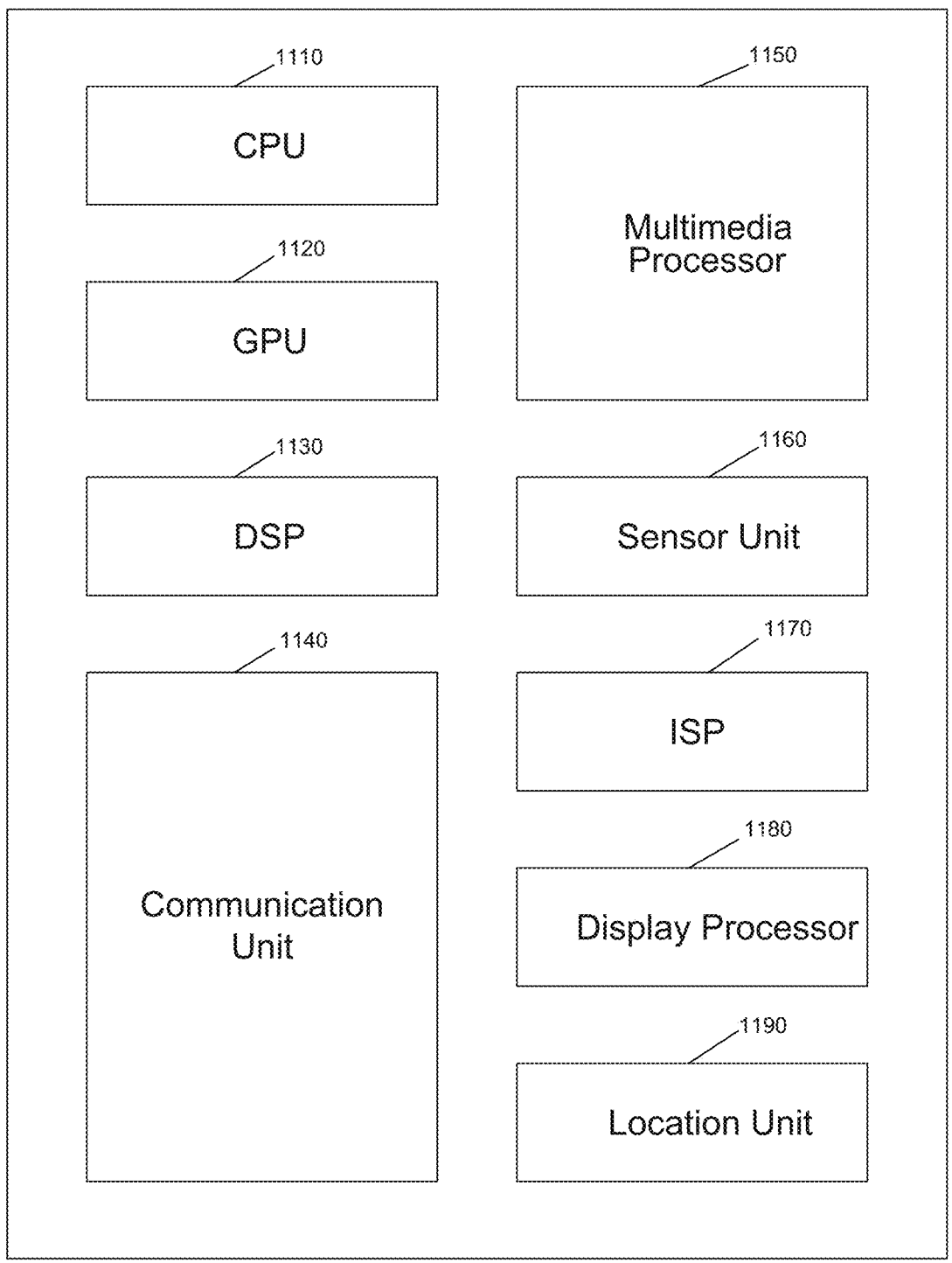
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
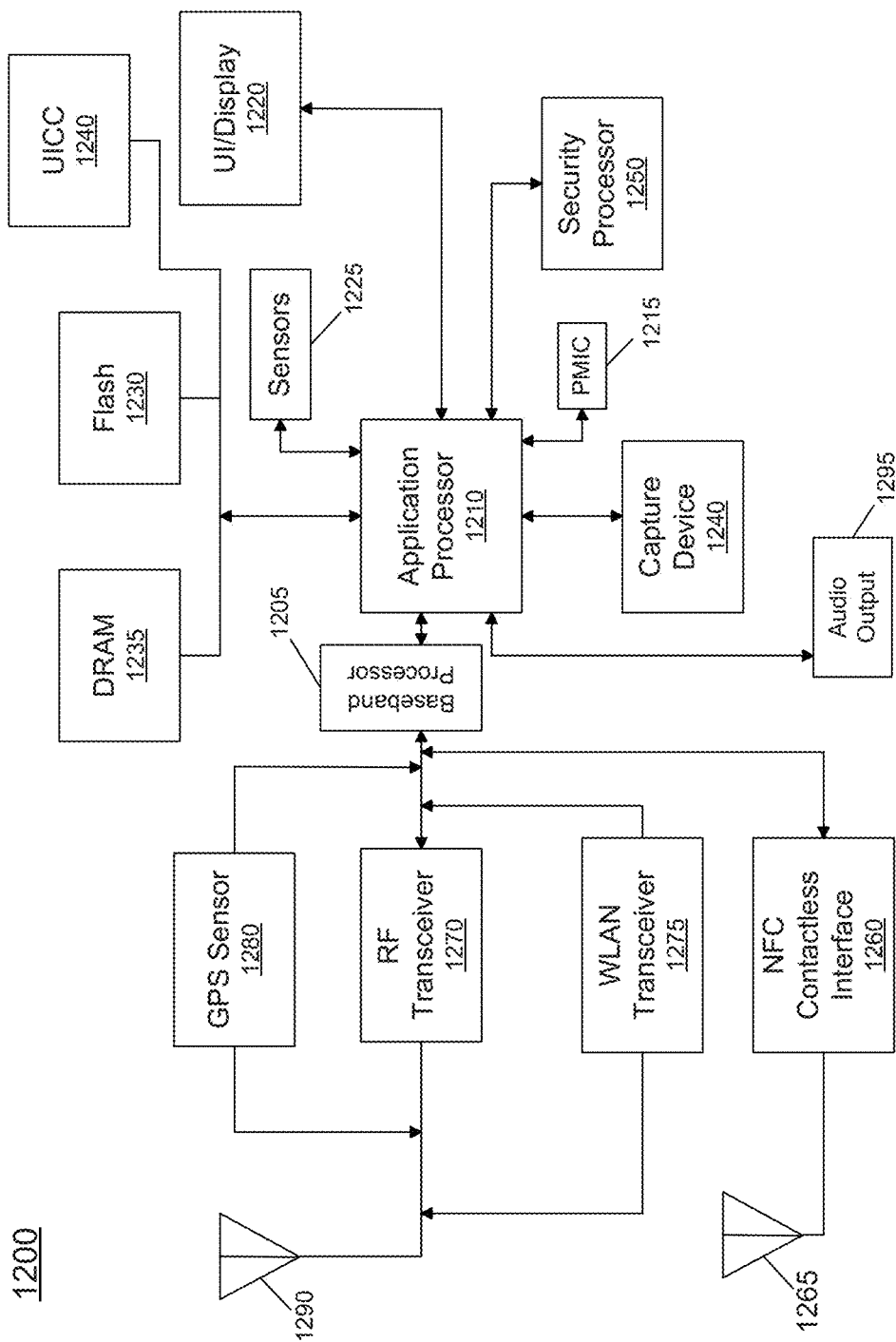
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
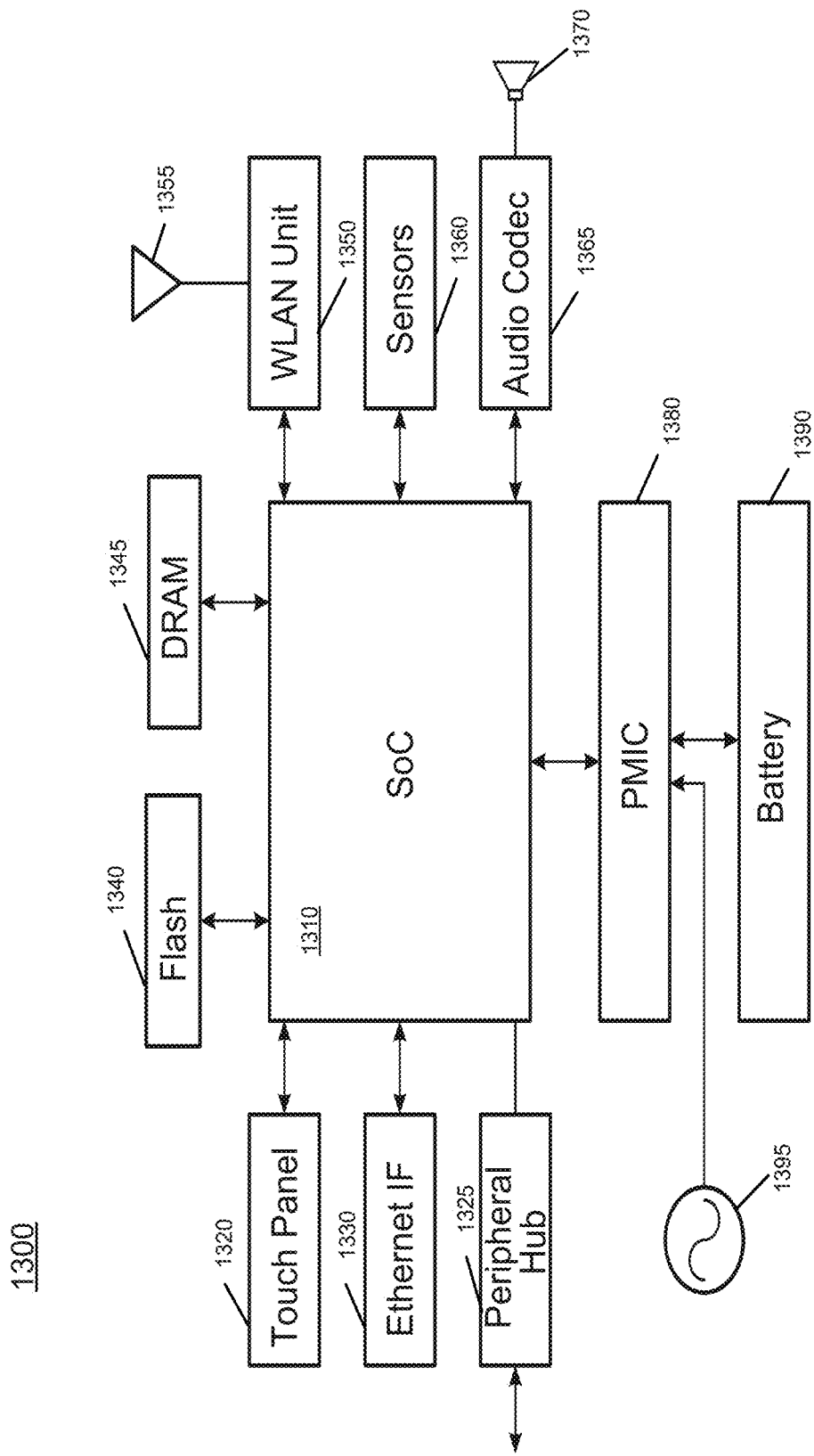
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
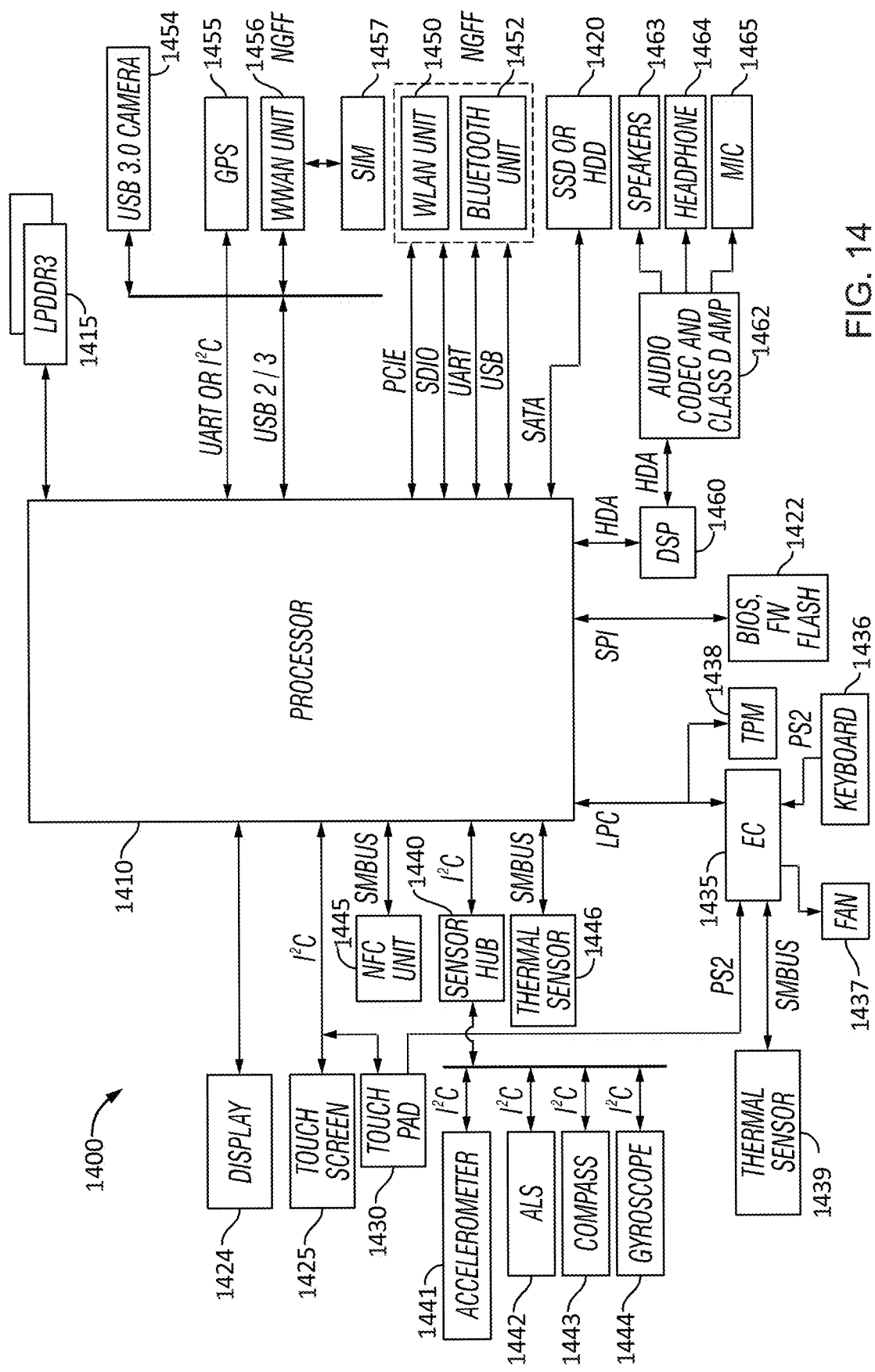
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
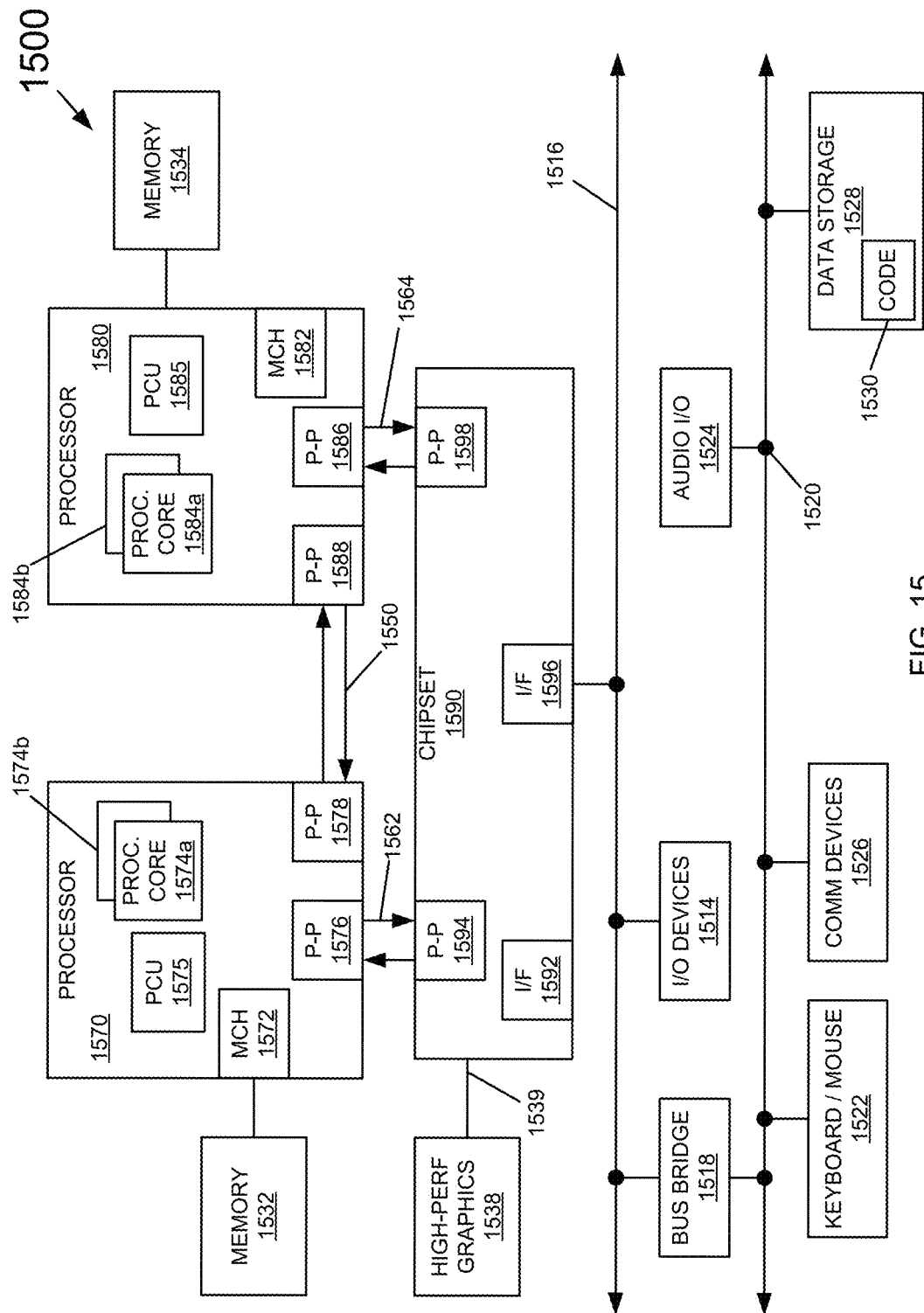
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU 1575, 1585 or other power management logic to perform processor-based power management as described herein. To this end, PCUs 1575 and 1585 include a power context control circuitry configured to independently maintain and securely protect power-related information, on a per process basis, as described, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
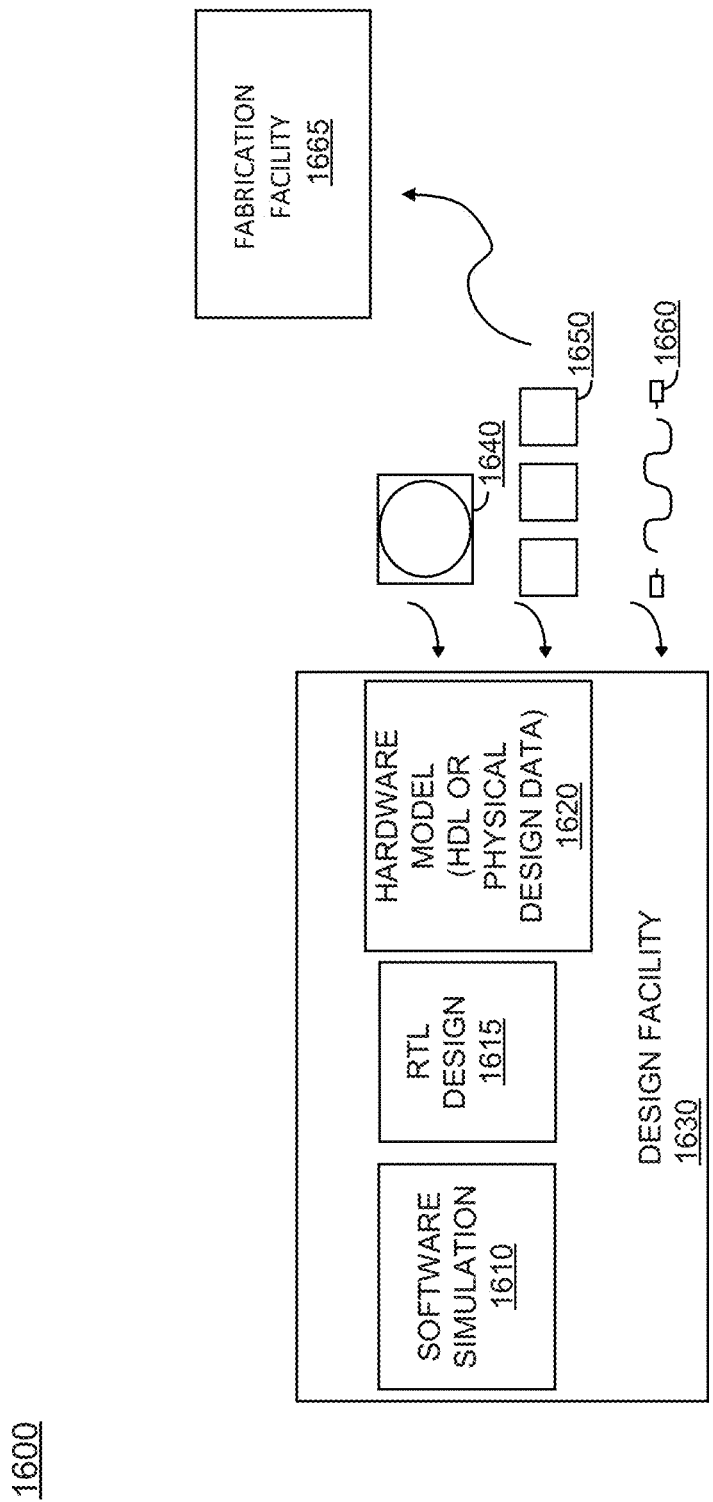
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
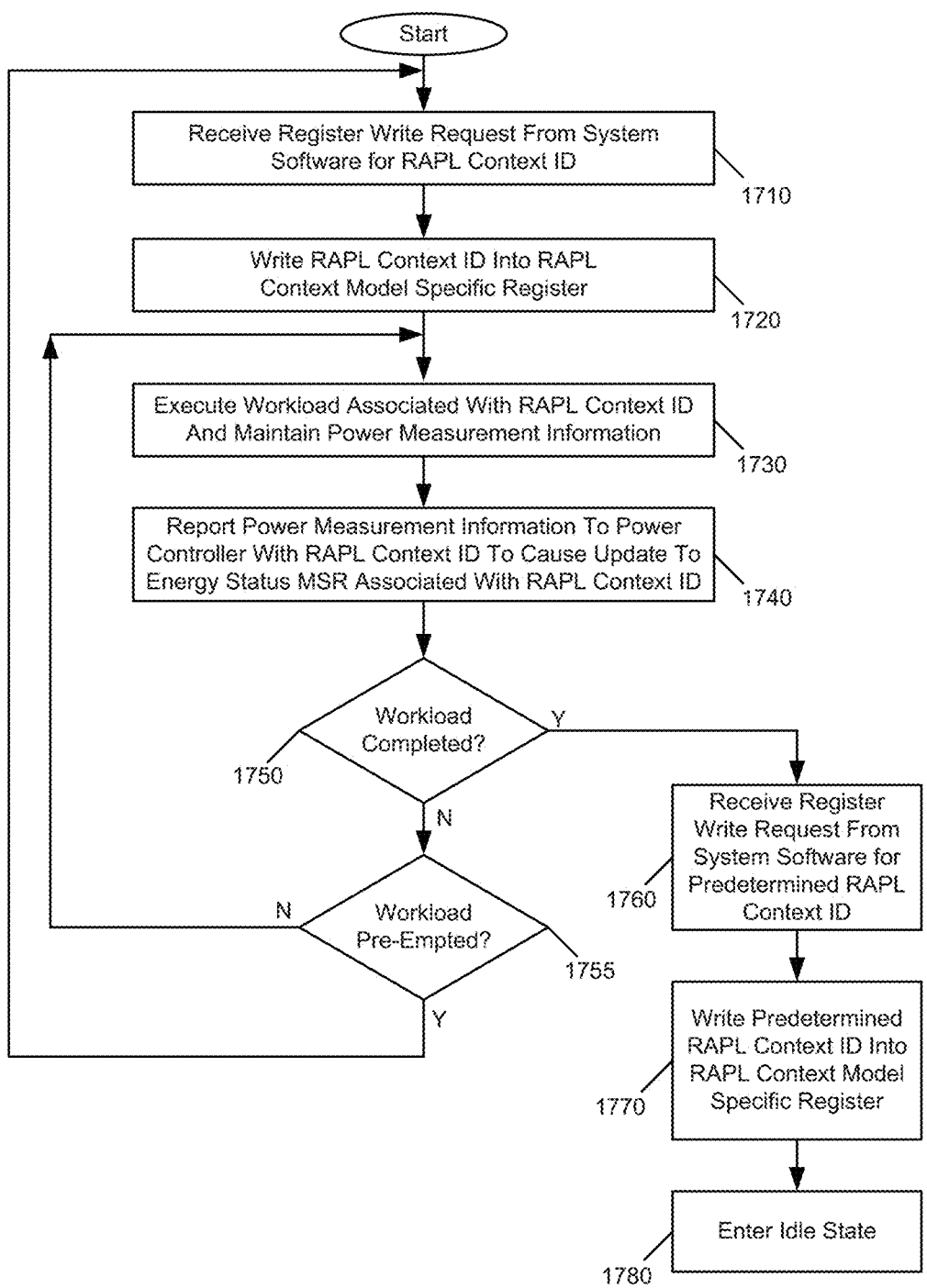
FIG. 17 is a flow diagram of a method in accordance with an embodiment.

Referring now to FIG. 17, shown is a flow diagram of a method in accordance with an embodiment. As shown in FIG. 17, method 1700 is a method for execution by a core to execute workloads and maintain power consumption information associated with a given RAPL context. As such, method 1700 may be performed by hardware circuitry, firmware, software and/or combinations thereof.

As illustrated, method 1700 begins by receiving a register write request (block 1710). This register write request may be received from system software for writing a RAPL context ID into a RAPL context MSR. For example, assume that system software sends the register write request with a RAPL context ID of 1, to indicate that a first VM is to be scheduled for execution on this core. Next at block 1720 this RAPL context ID is written into the RAPL context MSR.

At this point, system software may schedule a workload associated with this RAPL context ID to the core. For example, a given workload of the first VM may be scheduled to the core. Thus at block 1730 the core may execute this workload associated with the RAPL context ID. Furthermore, during workload execution, the core may maintain power measurement information for this workload. To this end, power measurement circuitry of the core may maintain this power measurement information. In an embodiment, this power measurement information may be in the form of accumulated Joules or a related quantity.

Still with reference to FIG. 17, at some interval (e.g., approximately 1 kHz interval), the core may report this power measurement information to a power controller. More specifically, shown at block 1740 the core may report this power measurement information with the RAPL context ID. Understand that in turn, the power controller may process this information and perform an update to energy status information stored in an energy status MSR associated with the RAPL context ID.

Next, control passes to diamond 1750 to determine whether the workload has been completed. If not, at diamond 1755 it is determined whether the workload is pre-empted, e.g., by a higher priority VM or other process. If no workload pre-emption occurs, control passes back to block 1730 where the core may further continue execution of the workload. Instead if it is determined that the workload is to be pre-empted, control passes back to block 1710, where the core may receive another register write request from system software with a new RAPL context ID, e.g., for the higher priority VM to be executed on the core.

Still referring to FIG. 17, instead when it is determined that the workload has been completed, control passes to block 1760. Here, this register write request may be received from system software for writing a predetermined RAPL context ID (e.g., having a value of 0 to indicate that no workload is to be executed) into the RAPL context MSR. Next at block 1770 this predetermined RAPL context ID is written into the RAPL context MSR. Finally, at block 1780 after this predetermined RAPL context ID has been written to the RAPL context MSR and there is no workload for the core to execute, the core may enter into an idle state. Understand while shown at this high level in the embodiment of FIG. 17, many variations and alternatives are possible.

Figure 18:
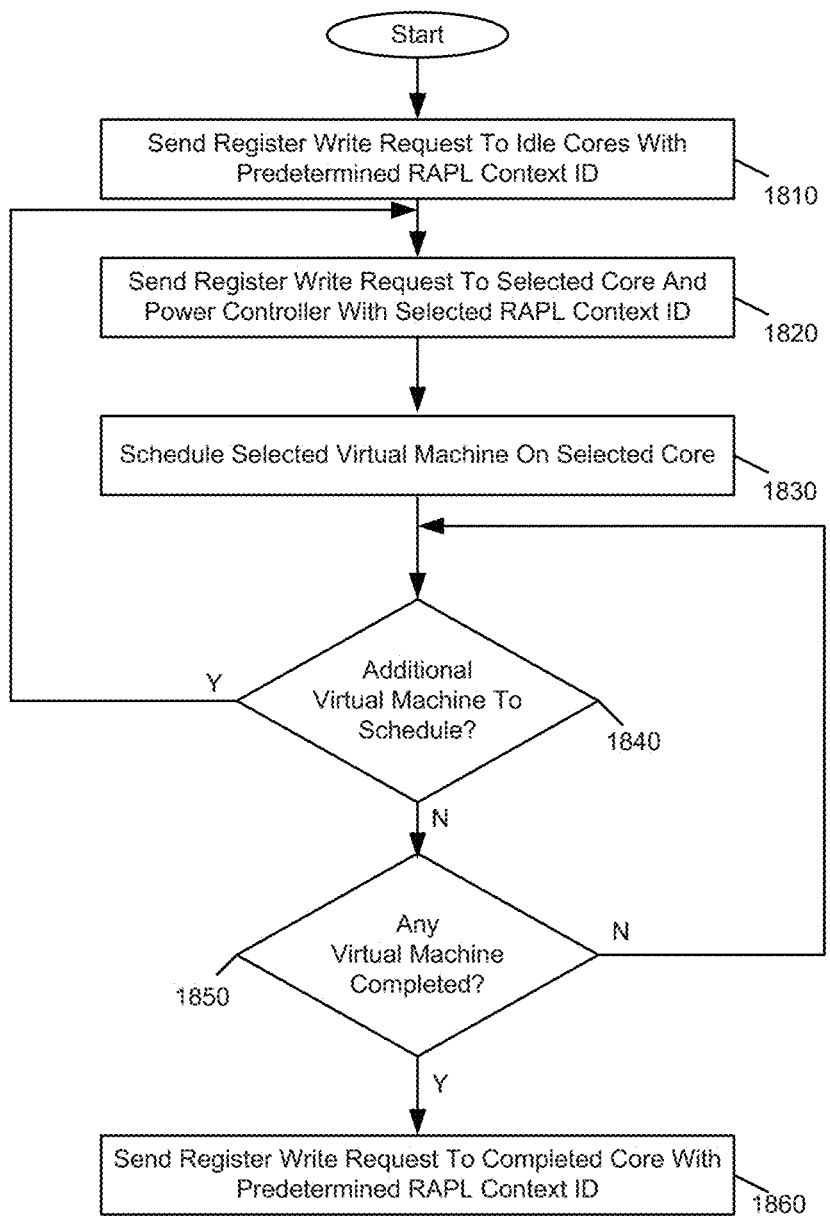
FIG. 18 is a flow diagram of a method in accordance with another embodiment.

Referring now to FIG. 18, shown is a flow diagram of a method in accordance with another embodiment. As shown in FIG. 18, method 1800 is a method for execution by host software such as a virtual machine monitor that may execute on one or more cores of a processor. As such, method 1800 may be performed by hardware circuitry, firmware, software and/or combinations thereof.

As illustrated, method 1800 begins by sending a register write request to one or more idle cores with a predetermined RAPL context ID (block 1810). As discussed above, this predetermined context ID may be a value of 0 to indicate idleness of the core.

Assume at some later time, system software seeks to schedule a selected VM for execution on a selected core. Prior to such scheduling, at block 1820 the system software may send a register write request to the selected core and the power controller with a corresponding selected RAPL context ID for this to-be scheduled VM. Note that both the core and the power controller may store the context ID into an appropriate storage, e.g., the RAPL context ID MSR of the core and a given internal memory location of the power controller.

Next at block 1830 the selected VM may be scheduled onto the selected core. As such, the core may execute one or more workloads of the selected VM. At block 1840, system software may determine whether there is any additional VM to be scheduled. If so, control passes back to block 1820 where another register write request is sent to another core. Next it may be determined whether any VM in execution on one or more cores has completed execution (block 1850). If not, control passes back to 1840. Note that these determinations at diamonds 1840, 1850 may be performed according to a scheduler tick interval, which in an embodiment may be on the order of approximately 10 microseconds.

If it is determined that the VM has completed execution on the core, control passes next to block 1860 where another register write request may be sent to the core on which this VM has completed execution. Here the register write request is for the predetermined RAPL context ID to indicate that the core is to enter into the idle state. While shown at this high level in the embodiment of FIG. 18, many variations and alternatives are possible. For example, understand that it is equally possible for a core to enter into back-to-back execution of different VM's, such that at block 1860 instead of writing the predetermined RAPL context ID, a RAPL context ID associated with a next VM to be executed on the core can be written.

Figure 19A:
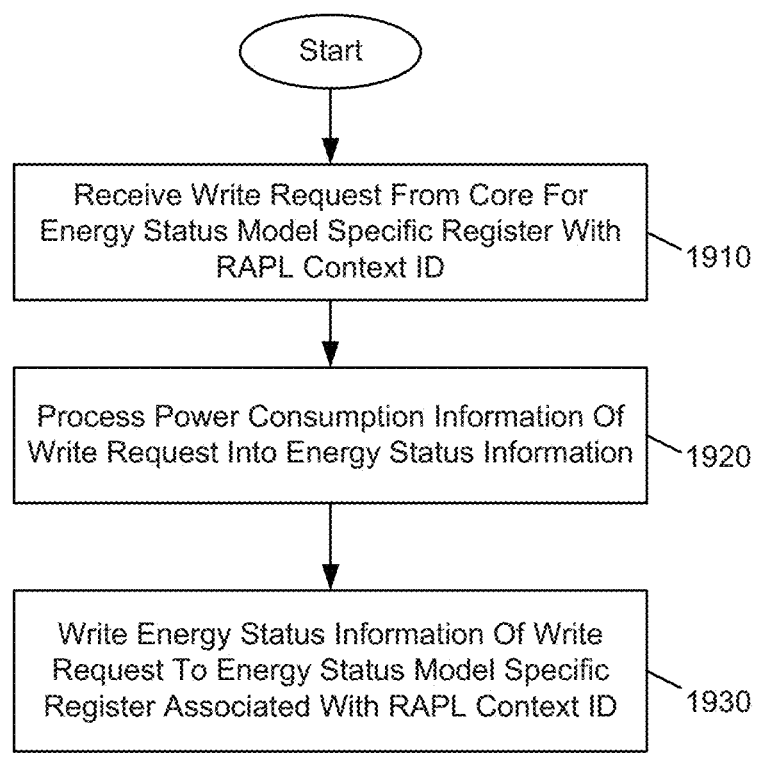
FIGS. 19A and 19B are flow diagrams of a method in accordance with yet another embodiment.
Figure 19B:
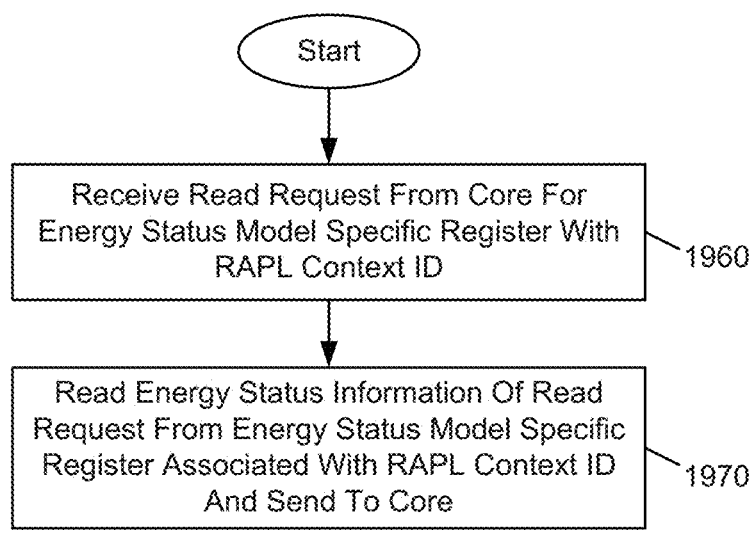

Referring now to FIGS. 19A and 19B, shown are flow diagrams of a method in accordance with yet another embodiment. As shown in FIGS. 19A and 19B, methods 1900 and 1950 are methods for execution by a power controller. As such, these methods may be performed by hardware circuitry, firmware, software and/or combinations thereof.

As illustrated, method 1900 begins by receiving a write request from a core (block 1910). More specifically, this write request is for an energy status MSR. Note that this write request is received with a RAPL context ID to indicate to the power controller to which energy status MSR information is to be written. Next, at block 1920 the power controller may process received power consumption information of this write request into energy status information. For example, the power controller may process the information, e.g., by way of a given conversion operation. In one embodiment, the power controller may convert the information to a power report given in Watts, based on a specified power unit multiplier. If relying on a default multiplier, the power controller may round to the nearest ⅛ Watt increment, as an example. In another embodiment, the power controller may convert the information to an energy report given in Joules, based on an energy status unit multiplier. If relying on a default multiplier, the power controller may round to the nearest 15.3 micro-Joule increment, as an example. In both cases, the power controller may take into account the values provided in a RAPL power unit MSR. Also, the power controller may accumulate the resulting energy status information with such information already stored in the appropriate energy status MSR. Finally, at block 1930 the power controller may write the energy status information of the write request into the given energy status MSR that is associated with the RAPL context ID.

With reference now to FIG. 19B, method 1950 begins by receiving a read request from a core (block 1960). More specifically, this read request is for an energy status MSR associated with a given RAPL context ID. Assuming that this requester, e.g., core is authorized to read this register (e.g., by matching of RAPL context IDs or other permission such as by receiving the request intermediated by host software), at block 1970 the power controller may read the energy status information stored in the given energy status MSR that is associated with the RAPL context and send it to the core requester. Understand while shown at this high level, additional interaction with host software may occur to authenticate requests before providing such information, ensuring isolation between VMs and other guest software.

Figure 20:
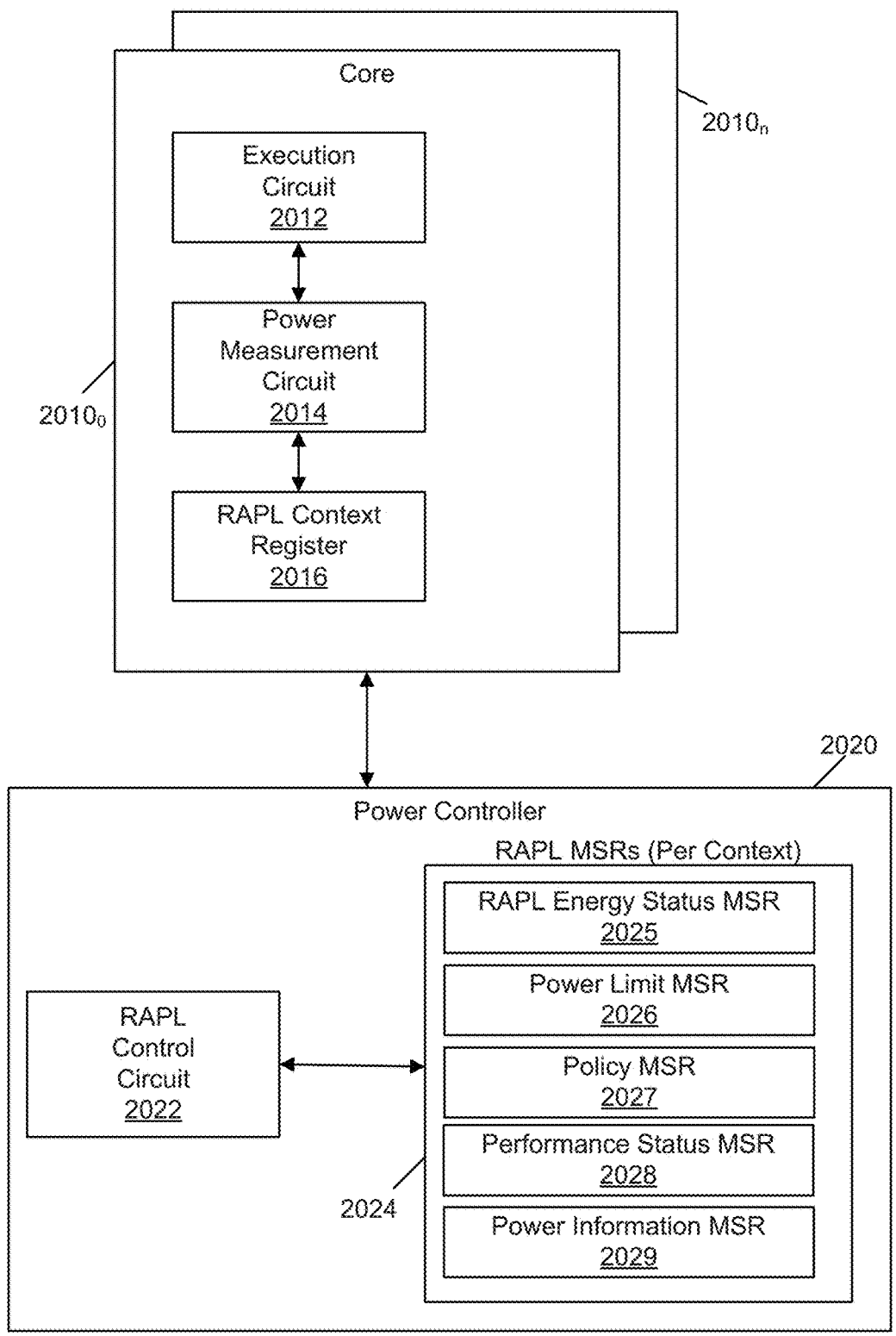
FIG. 20 is a block diagram of a processor in accordance with an embodiment.

Referring now to FIG. 20, shown is a block diagram of a processor in accordance with an embodiment. In the high level shown in FIG. 20, processor 2000 is illustrated with a plurality of cores 2010 and a power controller 2020 coupled to cores 2010. Understand however that many other components may be present in a processor 2000, including additional processing circuitry such as a graphics processor, interface circuitry, one or more cache memories and so forth. Further, while a high level view of a representative core 20100 and power controller 2020 are shown, understand that these components also may include additional constituent elements.

As illustrated, core 20100 includes at least one execution circuit 2012, which may perform operations in response to instructions. In various embodiments, multiple such execution circuits, including fixed point and floating-point execution units, single instruction multiple data execution units, among others may be present. Execution circuit 2012 couples to a power measurement circuit 2014. In various embodiments, power management circuit 2014 is configured to monitor power measurement information of core 2010 during its execution. As further shown, core 2010 also includes a RAPL context register 2016. As described herein, in response to a write request from system software, core 2010 may store a given RAPL context ID into RAPL context register 2016. In this situation, core 2010 may communicate power measurement information associated with this RAPL context ID to power controller 2020, e.g., according to a given interval, to enable power controller 2020 to maintain energy status information on a per VM basis.

As further shown in FIG. 20, power controller 2020 includes a RAPL control circuit 2022. Control circuit 2022 may be configured to receive and process incoming power measurement information and store such information, e.g., in the form of energy status information into a RAPL energy status MSR 2025 present in a given one of multiple sets of RAPL MSR's 2024, each of which may be associated with a given context. More specifically, when power controller 2020 receives power measurement information from a core 2010 associated with a first RAPL context ID, control circuit 2022 may process such information and store it in a given RAPL MSR set 2024 associated with that particular RAPL context ID. As shown, each set of RAPL MSR's 2024 may include a RAPL energy status MSR 2025, a power limit MSR 2026, a policy MSR 2027, a performance status MSR 2028, and power information MSR 2029.

In an embodiment, these registers may provide interfaces for various information, described as follows. Energy status MSR 2025 is an interface for reporting energy consumed during a previous measurement interval. Power limit MSR 2026 is an interface for configuring a limit imposed on average power drawn by the circuit. Policy MSR 2027 is an interface for communicating priority information as a hint to hardware for dividing a budget between sub-domains (e.g., graphics versus cores). Performance status MSR 2028 is an interface that reports the total time the package was throttled due to power limits. Power information MSR 2029 is an interface that reports power range information, such as minimum and maximum values for the configurable power limits. While shown at this high level in the embodiment of FIG. 20, many variations and alternatives are possible.

Figure 21:
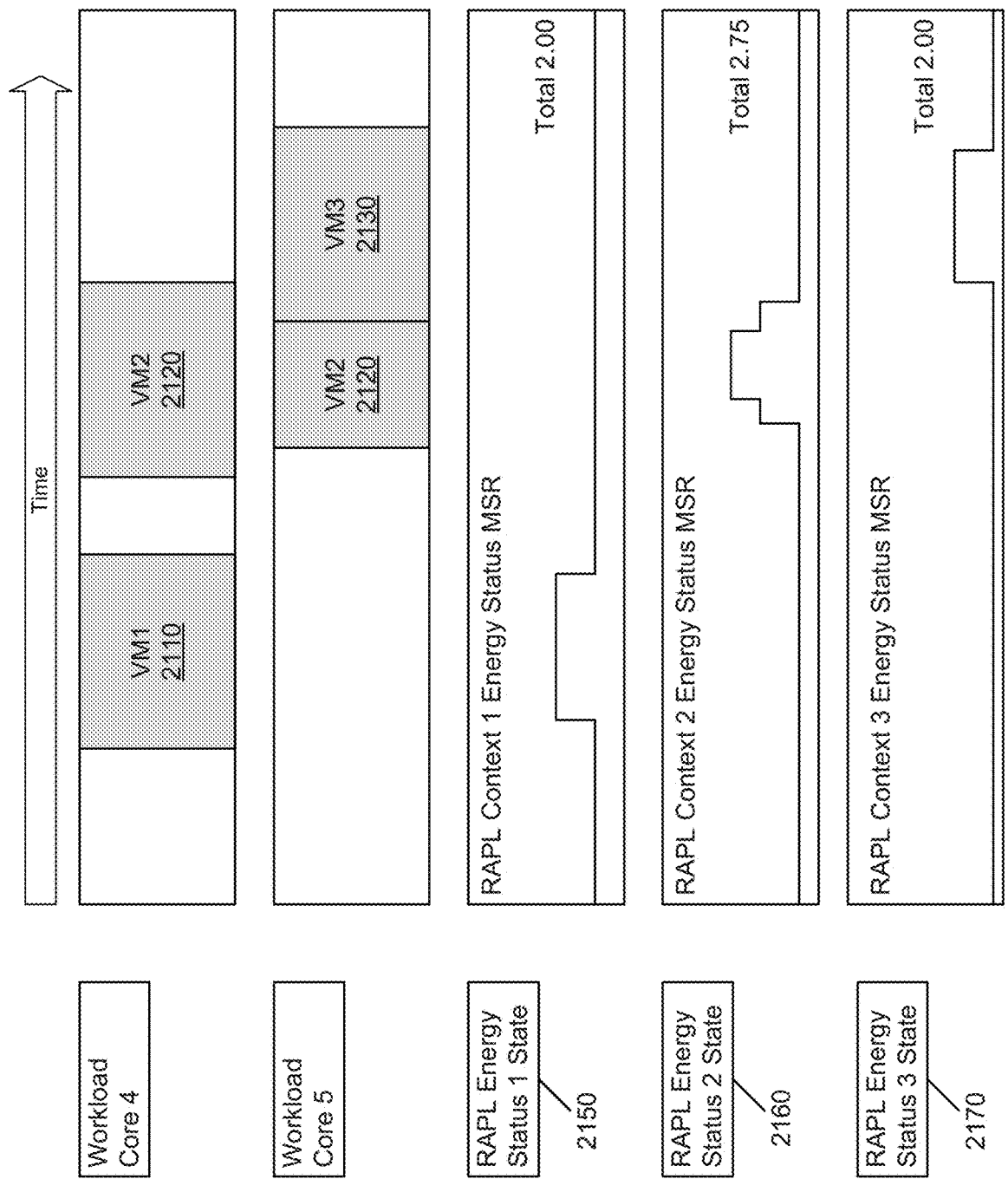
FIG. 21 is a block diagram of a portion of a processor in accordance with another embodiment.

Referring now to FIG. 21, shown is a block diagram of a portion of a processor in accordance with another embodiment. As shown in FIG. 21, processor 2100 includes multiple cores (illustrated in FIG. 21 as cores 4 and 5). Of course additional cores may be present. In addition, processor 2100 includes multiple RAPL energy status registers 2150, 2160, 2170. In an embodiment, these registers may be present in a power controller. Understand that these RAPL energy status registers may be virtualized, such that under programmatic control, each register may be associated with a particular virtual machine under control of system software. While FIG. 21 shows instantaneous power readings in these registers, in an embodiment the registers are cumulative (an integrated version of the information in FIG. 21).

As illustrated in FIG. 21, during a course of execution, system software schedules a first virtual machine 2110 and a second virtual machine 2120 to execute on core 4. And as further shown, system software schedules second VM 2120 to further execute on core 5, followed by execution of a third virtual machine 2130.

In connection with scheduling workloads of the different VMs to the various cores, system software also may program a RAPL context ID for each of these VMs to a given one of RAPL energy status registers 2150-2170. Thus as illustrated, register 2150 is virtualized for a first context, namely first VM 2110, register 2160 is virtualized for a second context, namely second VM 2120 and register 2170 is virtualized for a third context, namely third VM 2130. And with this arrangement, power monitoring information of the different VMs is maintained independently, and thus the information can be isolated and only provided to the given VM, avoiding a side channel security issue.

Figure 22:
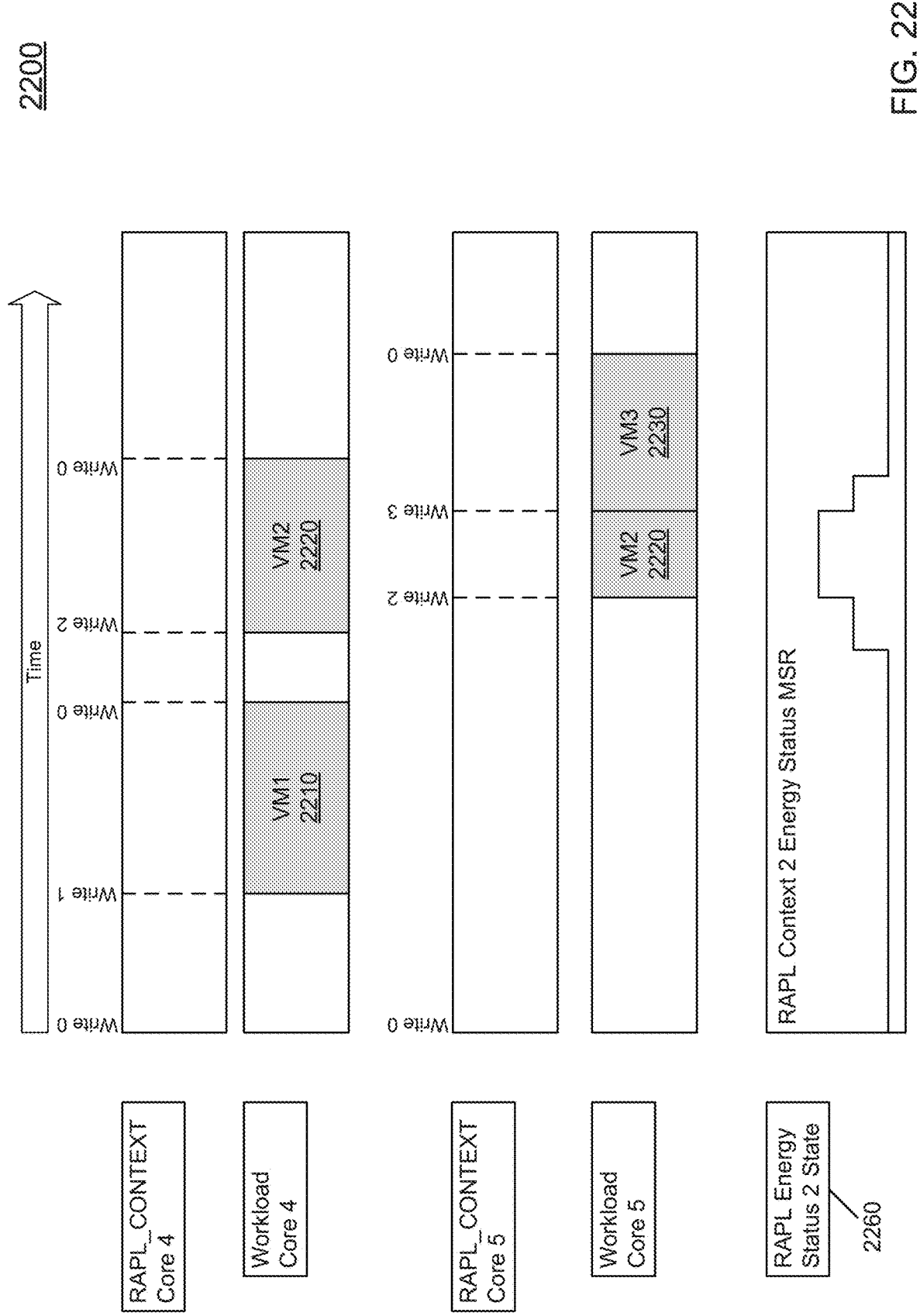
FIG. 22 is a block diagram of a portion of a processor in accordance with another embodiment.

Referring now to FIG. 22, shown is a block diagram of a portion of a processor in accordance with another embodiment. In general, processor 2200 may be similar to processor 2100. However here illustrated are the various register write operations issued by system software to enable allocation of RAPL context IDs for different contexts, each corresponding to a virtual machine. As shown, the following sequence of write events occur for an arrangement of 3 VMs (VM1 2210, VM2 2220 and VM3 2230) that execute over physical cores (4 and 5), scheduling of which is shown in FIG. 22.

Initially, both physical cores 4 and 5 are idle. Both cores have written context ID 0 into the RAPL context ID MSRs, their core-scoped MSR_CORE_RAPL_CONTEXT. Next VM1 2210 becomes runnable, and system software decides to schedule it on core 4. System software 4 writes a context ID value of 1 to MSR_CORE_RAPL_CONTEXT on core 4, and allows VM1 2210 to execute. Thus this VM executes on core 4 and its energy status is accumulated in a first ENERGY_STATUS MSR (not shown in FIG. 22).

As further shown in FIG. 22, when VM1 2210 stops executing, system software on core 4 writes 0 to its MSR_CORE_RAPL_CONTEXT MSR and the core goes idle. Thereafter VM2 2220 becomes runnable, and system software writes a value of 2 into MSR_CORE_RAPL_CONTEXT on core 4, and allows VM2 2220 to execute on core 4. Next, a second logical core of VM2 2220 becomes runnable, and system software writes a value of 2 into MSR_CORE_RAPL_CONTEXT on core 5 and allows VM2 2220 to execute on core 5. Thus VM2 2220 executes on two physical cores concurrently, and the energy status is accumulated in MSR_PKG_ENERGY_STATUS_2 2260.

Next as illustrated in FIG. 22, VM2 2220 on core 5 is pre-empted by VM3 2230. System software writes a value of 3 into MSR_CORE_RAPL_CONTEXT on core 5, and allows VM3 2230 to execute. VM2 2220 finishes its execution on core 4, and system software writes a value of 0 to CORE_RAPL_CONTEXT MSR on core 4, which then goes idle. Finally, VM3 2230 finishes its execution on core 5, and system software writes a value of 0 to CORE_RAPL_CONTEXT MSR on core 5, which then goes idle.

Table 1 below shows which VM corresponds to which RAPL context, regardless of which core it executes on.

TABLE 1

| Execution | RAPL Context ID |
|---|---|
| Idle | 0 |
| VM1 | 1 |
| VM2 | 2 |
| VM3 | 3 |

Embodiments also may be compatible with unaware host system software. In such cases, the default system state is that all cores accumulate their energy measurement in MSR_PKG_ENERGY_STATUS_0, and that that ENERGY_STATUS MSR maps to the current RAPL_ENERGY_STATUS MSR. This means that host software that is unaware of this feature sees RAPL behavior on a domain-only basis, and not per RAPL context as described herein.

Embodiments also may be compatible with unaware guest system software running in a VM. In such a case, the hypervisor with host system software can provide guest-only power information to the guest without the guest being aware of it, and purely reading RAPL registers for this RAPL context. Namely, if a host were to emulate RAPL energy status with an embodiment, then unmodified guests can benefit directly, as the RAPL ENERGY_STATUS reads are intercepted by the hypervisor and the correct RAPL ENERGY_STATUS context (known by the hypervisor but not the guest) can be read, and forwarded to the guest.

To this end, whenever a guest VM1 attempts to read a package RAPL ENERGY_STATUS MSR, software code traps this RAPL register read and returns the virtualized value accumulated in MSR_PKG_ENERGY_STATUS_1, with the VM being none the wiser.

This means VM1 has no power information of any other code executing in the system, as it only has access to its own ENERGY_STATUS RAPL register. Similarly, processes can be grouped together (e.g., by owner) in a RAPL context such that they only have access to their own power usage. Note that where VM1 is to be concurrently executed on more than one core, embodiments may track power consumption information across cores.

In embodiments, RAPL status MSRs are purposefully package-scoped. This allows, with minimal host system software knowledge (maintaining RAPL context ID per process/VM), a power controller to perform per RAPL context operation transparent to cross-core process migration. Stated another way, processes migrating between cores is of no consequence in an embodiment. Further, while migration in a multi-socket system may be infrequent, a mechanism for cross-socket power controller communication may enable retaining such context.

In some implementations, per-thread power usage also may be realized. Further, in some cases, VMs may be allowed to directly use embodiments to also have virtualized power meters inside the guest.

The following examples pertain to further embodiments.

In one example, a processor comprises: a plurality of cores, each of the plurality of cores comprising: an execution circuit, a power measurement circuit to measure power consumption of the core and a first register to store a power-related context identifier to identify a process to be executed on the core; and a controller coupled to the plurality of cores. The controller may include: a plurality of energy status registers each associated with a power-related context identifier and to store energy consumption information of a process; and a control circuit coupled to the plurality of energy status registers, wherein the control circuit is to enable each of a plurality of processes to independently monitor the energy consumption information of the process and prevent each of the plurality of processes from monitoring the energy consumption information of other ones of the plurality of processes.

In an example, the control circuit is to receive first power consumption information of a first process in execution on a first core and, based at least in part on the first power consumption information, store first energy consumption information in a first energy status register associated with the power-related context identifier of the first process.

In an example, the plurality of cores comprises the first core and a second core, wherein when the first core and the second core are to execute a first virtual machine comprising the first process, the first register of the first core and the first register of the second core are to store a first power-related context identifier to identify the first virtual machine.

In an example, the control circuit is to process the first power consumption information to obtain the first energy consumption information.

In an example, the first core is to receive a register write request to write the first power-related context identifier to the first register and thereafter to execute the first virtual machine.

In an example, the first virtual machine is to read the first energy consumption information stored in the first energy status register.

In an example, the control circuit is to prevent any other virtual machine from reading the first energy consumption information.

In an example, the power measurement circuit of the first core is to measure the power consumption of the first core and maintain the first power consumption information, the first core to send the first power consumption information to the controller with the power-related context identifier of the first process.

In an example, the controller further comprises a plurality of sets of power-related registers, each of the plurality of sets of power-related registers to be associated with a power-related context identifier.

In an example, the plurality of cores comprises a first core and a second core and when a first virtual machine is to execute on the first core and the second core, the controller is cause a first energy status register of the plurality of energy status registers to store energy consumption information of the first virtual machine based on power consumption information from the first core and the second core.

In another example, a method comprises: sending a first register write request with a predetermined power-related context identifier to a first core, to cause the first core to write the predetermined power-related context identifier into a power-related context register of the first core when the first core is to be idle; sending a second register write request with a first power-related context identifier to the first core, to cause the first core to write the first power-related context identifier into the power-related context register of the first core when the first core is to execute a first virtual machine, to cause the first core to maintain power measurement information regarding the execution of the first virtual machine on the first core; and receiving a request from the first virtual machine for power-related information of the first virtual machine and providing the request to a power controller of the processor to cause the power controller to send the power-related information of the first virtual machine to the first virtual machine.

In an example, the method further comprises preventing one or more other virtual machines from receiving the power-related information of the first virtual machine.

In an example, the method further comprises sending the first power-related context identifier to the power controller to cause the power controller to maintain the power-related information of the first virtual machine in a first one of a plurality of energy status registers.

In an example, the request from the first virtual machine comprises a read request for a package energy status register, and the method further comprises: in response to the request, causing the power controller to send the power-related information of the first virtual machine stored in the first one of the plurality of energy status registers.

In an example, the method further comprises sending a third register write request with the first power-related context identifier to a second core, to cause the second core to write the first power-related context identifier into a power-related context register of the second core when the second core is to execute the first virtual machine, to cause the second core to maintain power measurement information regarding the execution of the first virtual machine on the second core.

In an example, the method further comprises sending another register write request with a second power-related context identifier to the first core, to cause the first core to write the second power-related context identifier into the power-related context register of the first core when the first core is to execute the second virtual machine, to cause the first core to maintain power measurement information regarding the execution of the second virtual machine on the first core.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a processor and a system memory coupled to the processor, the system memory to store at least a portion of a host software. The processor may comprise: a plurality of cores, each of the plurality of cores comprising an execution circuit, a power measurement circuit to measure power consumption of the core and a power-related context register to store a context identifier to identify a guest to be executed on the core; and a power controller coupled to the plurality of cores. The power controller may include: a plurality of energy status registers each associated with a power-related context identifier and to store energy consumption information of the guest to be executed on the core; and a control circuit coupled to the plurality of energy status registers, where the control circuit is to enable each of a plurality of guests to independently monitor the energy consumption information of the guest and prevent each of the plurality of guests from monitoring the energy consumption information of other ones of the plurality of guests.

In an example, a first core is to: receive a register write request to write a first context identifier for a first guest into the power-related context register and thereafter execute the first guest; and send first power consumption information associated with the first context identifier to the power controller, to enable the power controller to process the first power consumption information to store first energy consumption information of the first guest in a first energy status register of the plurality of energy status registers.

In an example, in response to a read request from the first guest, the host software is to enable the first guest to read the first energy consumption information.

In an example, the host software is to intercept the read request, obtain the first energy consumption information from the power controller, and send the first energy consumption information to the first guest.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising
a plurality of cores, each of the plurality of cores comprising:
an execution circuit, a power measurement circuit to measure power consumption of the core and a first register to store a power-related context identifier to identify a process to be executed on the core; and
a controller coupled to the plurality of cores, the controller comprising:
a plurality of energy status registers each associated with a power-related context identifier and to store energy consumption information of a process; and
a control circuit coupled to the plurality of energy status registers, wherein the control circuit is to enable each of a plurality of processes to independently monitor the energy consumption information of the process and prevent each of the plurality of processes from monitoring the energy consumption information of other ones of the plurality of processes.

2. The processor of claim 1, wherein the control circuit is to receive first power consumption information of a first process in execution on a first core and, based at least in part on the first power consumption information, store first energy consumption information in a first energy status register associated with the power-related context identifier of the first process.

3. The processor of claim 2, wherein the control circuit is to process the first power consumption information to obtain the first energy consumption information.

4. The processor of claim 2, wherein the plurality of cores comprises the first core and a second core, wherein when the first core and the second core are to execute a first virtual machine comprising the first process, the first register of the first core and the first register of the second core are to store a first power-related context identifier to identify the first virtual machine.

5. The processor of claim 4, wherein the first core is to receive a register write request to write the first power-related context identifier to the first register and thereafter to execute the first virtual machine.

6. The processor of claim 4, wherein the first virtual machine is to read the first energy consumption information stored in the first energy status register.

7. The processor of claim 6, wherein the control circuit is to prevent any other virtual machine from reading the first energy consumption information.

8. The processor of claim 2, wherein the power measurement circuit of the first core is to measure the power consumption of the first core and maintain the first power consumption information, the first core to send the first power consumption information to the controller with the power-related context identifier of the first process.

9. The processor of claim 1, wherein the controller further comprises a plurality of sets of power-related registers, each of the plurality of sets of power-related registers to be associated with a power-related context identifier.

10. The processor of claim 9, wherein the plurality of cores comprises a first core and a second core and when a first virtual machine is to execute on the first core and the second core, the controller is to cause a first energy status register of the plurality of energy status registers to store energy consumption information of the first virtual machine based on power consumption information from the first core and the second core.

11. At least one non-transitory computer readable storage medium having stored thereon instructions, which when performed by a machine cause the machine to perform a method comprising:
sending a first register write request with a predetermined power-related context identifier to a first core, to cause the first core to write the predetermined power-related context identifier into a power-related context register of the first core when the first core is to be idle;
sending a second register write request with a first power-related context identifier to the first core, to cause the first core to write the first power-related context identifier into the power-related context register of the first core when the first core is to execute a first virtual machine, to cause the first core to maintain power measurement information regarding the execution of the first virtual machine on the first core; and
receiving a request from the first virtual machine for power-related information of the first virtual machine and providing the request to a power controller of the processor to cause the power controller to send the power-related information of the first virtual machine to the first virtual machine.

12. The at least one non-transitory computer readable storage medium of claim 11, wherein the method further comprises preventing one or more other virtual machines from receiving the power-related information of the first virtual machine.

13. The at least one non-transitory computer readable storage medium of claim 11, wherein the method further comprises sending the first power-related context identifier to the power controller to cause the power controller to maintain the power-related information of the first virtual machine in a first one of a plurality of energy status registers.

14. The at least one non-transitory computer readable storage medium of claim 13, wherein the request from the first virtual machine comprises a read request for a package energy status register, and the method further comprises:
in response to the request, causing the power controller to send the power-related information of the first virtual machine stored in the first one of the plurality of energy status registers.

15. The at least one non-transitory computer readable storage medium of claim 11, wherein the method further comprises sending a third register write request with the first power-related context identifier to a second core, to cause the second core to write the first power-related context identifier into a power-related context register of the second core when the second core is to execute the first virtual machine, to cause the second core to maintain power measurement information regarding the execution of the first virtual machine on the second core.

16. The at least one non-transitory computer readable storage medium of claim 11, wherein the method further comprises sending another register write request with a second power-related context identifier to the first core, to cause the first core to write the second power-related context identifier into the power-related context register of the first core when the first core is to execute the second virtual machine, to cause the first core to maintain power measurement information regarding the execution of the second virtual machine on the first core.

17. A system comprising:
a processor comprising:
a plurality of cores, each of the plurality of cores comprising an execution circuit, a power measurement circuit to measure power consumption of the core and a power-related context register to store a context identifier to identify a guest to be executed on the core; and
a power controller coupled to the plurality of cores, the power controller comprising:
a plurality of energy status registers each associated with a power-related context identifier and to store energy consumption information of the guest to be executed on the core; and
a control circuit coupled to the plurality of energy status registers, wherein the control circuit is to enable each of a plurality of guests to independently monitor the energy consumption information of the guest and prevent each of the plurality of guests from monitoring the energy consumption information of other ones of the plurality of guests; and
a system memory coupled to the processor, the system memory to store at least a portion of a host software.

18. The system of claim 17, wherein a first core is to:
receive a register write request to write a first context identifier for a first guest into the power-related context register and thereafter execute the first guest; and
send first power consumption information associated with the first context identifier to the power controller, to enable the power controller to process the first power consumption information to store first energy consumption information of the first guest in a first energy status register of the plurality of energy status registers.

19. The system of claim 18, wherein in response to a read request from the first guest, the host software is to enable the first guest to read the first energy consumption information.

20. The system of claim 19, wherein the host software is to intercept the read request, obtain the first energy consumption information from the power controller, and send the first energy consumption information to the first guest.

* * * * *